(12) United States Patent
Ramon

(10) Patent No.: US 11,617,442 B2
(45) Date of Patent: Apr. 4, 2023

(54) ACTIVE SITTING MECHANISM

(71) Applicant: Ararat Technical Business Ltd.

(72) Inventor: Arie Ramon, Jerusalem (IL)

(*) Notice: Subject to any disclaimer, the term of this patent is extended or adjusted under 35 U.S.C. 154(b) by 261 days.

(21) Appl. No.: 16/769,617

(22) PCT Filed: Mar. 19, 2020

(86) PCT No.: PCT/IL2020/050333
§ 371 (c)(1),
(2) Date: Jun. 4, 2020

(87) PCT Pub. No.: WO2020/188574
PCT Pub. Date: Sep. 24, 2020

(65) Prior Publication Data
US 2021/0274939 A1 Sep. 9, 2021

Related U.S. Application Data

(60) Provisional application No. 62/820,858, filed on Mar. 20, 2019.

(51) Int. Cl.
*A47C 3/027* (2006.01)
*A47C 3/026* (2006.01)
(Continued)

(52) U.S. Cl.
CPC .............. *A47C 3/027* (2013.01); *A47C 3/025* (2013.01); *A47C 3/026* (2013.01); *A47C 3/0255* (2013.01);
(Continued)

(58) Field of Classification Search
CPC ....... A47C 3/025; A47C 3/0255; A47C 3/026; A47C 3/027; A47C 3/03; A47C 3/18; A47C 3/26; F16M 11/2035
(Continued)

(56) References Cited

U.S. PATENT DOCUMENTS

| 4,431,157 A * | 2/1984 | Arild ..................... | A47C 7/4454 248/608 |
| 10,881,208 B2 * | 1/2021 | Yajima ................. | A47C 3/0257 |

(Continued)

FOREIGN PATENT DOCUMENTS

| DE | 19507458 | 10/1995 |
| EP | 0920823 | 6/1999 |
| EP | 1090568 | 4/2001 |

*Primary Examiner* — Robert Canfield
(74) *Attorney, Agent, or Firm* — JMB Davis Ben-David

(57) ABSTRACT

Disclosed herein is a cylindrical rocker mechanism including a top assembly having a first cavity, a middle assembly including at least one middle lug aligned with the first cavity to facilitate insertion of a first pin therethrough thereby coupling the top assembly with the middle assembly, a second cavity aligned perpendicularly to the at least one middle lug, a bottom assembly having a horizontal plate, and at least one bottom lug aligned with the second cavity to facilitate insertion of a second pin therethrough thereby coupling the top assembly with the middle assembly, wherein the top, and middle assemblies move and roll in perpendicular directions thereby facilitating a friction dependent, substantially slip-less, omnidirectional, rolling and a tilting motion of the top assembly in response to a force applied by a subject to top assembly.

4 Claims, 19 Drawing Sheets

(51) Int. Cl.
   *F16M 11/20*     (2006.01)
   *A47C 3/18*      (2006.01)
   *A47C 3/26*      (2006.01)
   *A47C 3/025*     (2006.01)
   *A47C 3/03*      (2006.01)

(52) U.S. Cl.
   CPC ................. *A47C 3/03* (2013.01); *A47C 3/18* (2013.01); *A47C 3/26* (2013.01); *F16M 11/2035* (2013.01)

(58) Field of Classification Search
   USPC ... 297/258.1, 259.1, 314, 461, 270.1, 270.3; 248/371
   See application file for complete search history.

(56) References Cited

U.S. PATENT DOCUMENTS

| | | | |
|---|---|---|---|
| 2009/0282615 A1* | 11/2009 | Prosch ................. | A47C 3/0255 |
| | | | 5/607 |
| 2010/0289310 A1 | 11/2010 | Huttenhuis et al. | |
| 2016/0169441 A1* | 6/2016 | Hung ................... | F16M 11/121 |
| | | | 248/371 |
| 2018/0304121 A1* | 10/2018 | Osler ................... | A63B 26/003 |
| 2019/0246797 A1* | 8/2019 | Shih ..................... | A47C 3/0251 |
| 2020/0196761 A1* | 6/2020 | Chang ................. | A61G 5/1075 |
| 2020/0315355 A1* | 10/2020 | Shibamoto ............ | A47C 7/441 |

\* cited by examiner

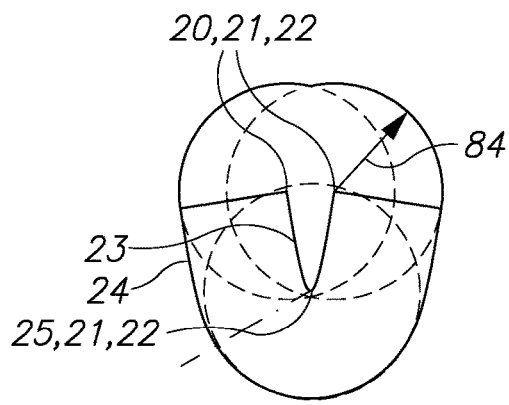
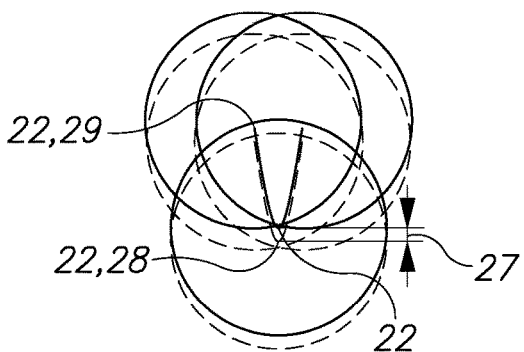
FIG.24  FIG.25
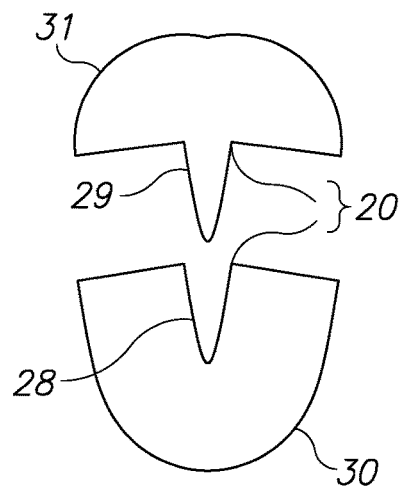
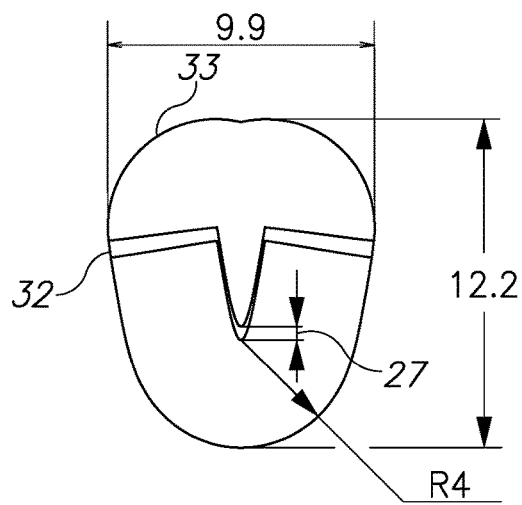
FIG.26  FIG.27
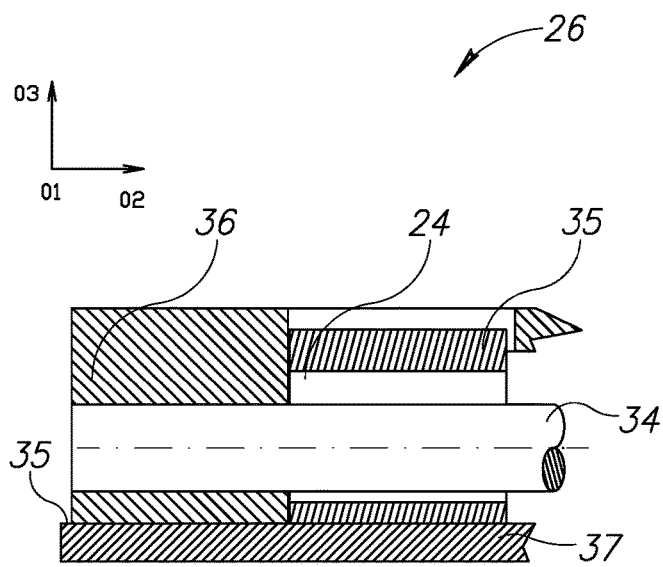
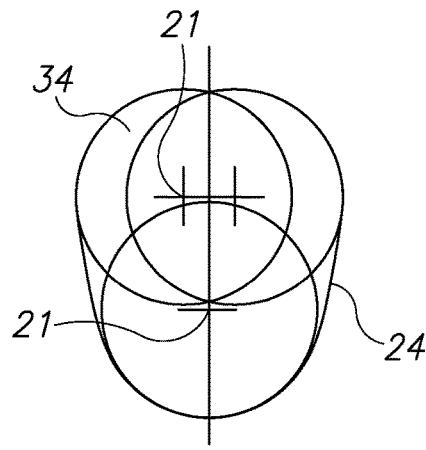
FIG.28  FIG.29

ACTIVE SITTING MECHANISM

CROSS-REFERENCE TO RELATED APPLICATIONS

This is the U.S. National Stage of International Patent Application No. PCT/IL2020/050333 filed on Mar. 19, 2020, which in turn claims the benefit of U.S. Provisional Patent Application No. 62/820,858 filed on Mar. 20, 2019.

BACKGROUND

The invention relates to the field of active sitting, stability and support.

Human bodies generally require constant activity to remain supple and healthy. Unfortunately, modern life involves extensive periods of sitting, for example, most professions require many hours of continuous sitting.

Sitting aligns the human body in an odd manner. Users, being absorbed in work, fail to change their sitting postures. This denies joints the necessary small changes in sitting positions, changes that help circulation of blood and joint fluid. Additionally, sitting still denies core muscles the exercise involved in aligning and realigning the spine. Further, extended and repetitive sitting has been linked to other health maladies, such as heart disease, respiratory problems and the like.

The biomechanics of the spine allow the human body to accommodate numerous movements; namely, spinal flexion, right and left extension, right and left rotation, lateral bending, as well as long-axis distraction and compression or load/unload cycles. In conventional chairs or sitting platforms, motion and/or a static position maintained by the user that results in one or more of these spinal movements causes the user's spine and associated soft tissues to absorb the entire motion and the associated stresses. Static spinal positioning or inadequate sitting platform mobility causes a build-up of spinal irritation, soft tissue pressure, muscle spasm, loss of tone, etc. Furthermore, there can be circulatory disturbance in the spinal soft tissues resulting in significant stress on the person's spine. Without the ability to compensate for and/or produce these essential movements, the user can frequently experience backaches and eventual spinal pathology and degeneration resulting from prolonged static sitting.

Even though the disclosure focuses on sitting applications of the active sitting mechanism, it can be used in other applications requiring a platform changing its tilt and direction of tilt which are determined by point of application of a vertical force or position of a load of mass.

SUMMARY

The following embodiments and aspects thereof are described and illustrated in conjunction with systems, tools and methods which are meant to be exemplary and illustrative, not limiting in scope.

There is provided, in accordance with an embodiment, a cylindrical rocker mechanism including, a top assembly having a first cavity; a middle assembly including: at least one middle lug aligned with the first cavity to facilitate insertion of a first pin therethrough thereby coupling the top assembly with the middle assembly; a second cavity aligned perpendicularly to the at least one middle lug; a bottom assembly having a horizontal plate; and, at least one bottom lug aligned with the second cavity to facilitate insertion of a second pin therethrough thereby coupling the top assembly with the middle assembly; wherein the top, and middle assemblies move in perpendicular directions thereby facilitating a friction dependent, substantially slip-less, omnidirectional, rolling and a tilting motion of the top assembly in response to a force applied by a subject to top assembly.

In certain embodiments, the top and middle assemblies have a cylindrical surface facilitating the rolling motion.

In certain embodiments, the top rocker and middle rocker include, respectively a first cylindrical surface and a second cylindrical surface, having a predetermined rocker radius, which is larger than a distance of a center of mass of the subject from an upper surface of the bottom assembly; wherein the mechanism is in stable equilibrium and the rolling occurs with zero energy expenditure.

In certain embodiments, the mechanism further includes a sitting platform; a spacer configured between the sitting platform and the top assembly to provide an increased forward tilt thereby facilitating a forward tilt of a pelvis and neutral posture of a subject while sitting on the sitting platform.

In certain embodiments, the mechanism further includes at least four flat, tangential to cylindrical surfaces stop surfaces configured to control a predetermined maximum tilt angle of the top assembly and the middle assembly.

In certain embodiments, the at least one middle lug having a predetermined shape including a bottom curve having points of a top path after translation downwards by predetermined offset and the points being distanced outwards from the top path by retaining pin radius; and, a top curve having two arcs and having a retaining pin radius centered about top path ends and a line tangential to the two arcs and two straight line segments, each tangential to the top curve and the bottom curve, wherein the lug shape is configured to enable free motion along a predetermined range of curtate cycloid trajectories of the first pin allowing predetermined wear of the rocker and to eliminate results of slip.

In certain embodiments, each of the top rocker and horizontal plate having an extended length and the top rocker cooperating with male spherical stops coupled to forward portion of the horizontal plate to immobilize the top assembly in response to a force applied which causes the top assembly to tilt forward and rest on the spherical stops thereby facilitating mounting of the sitting platform by the subject.

There is also provided, in accordance with an embodiment a spherical rocker mechanism including a plate assembly having a surface; a spherical plate having a spherical surface configured to provide a friction depended, substantially slip-less, omnidirectional, rolling motion along the surface in response to a force applied by a subject to the spherical plate and, a coupling element coupling the spherical plate with the plate assembly thereby preventing separation of the spherical plate and plate assembly during the rolling motion.

In certain embodiments, the coupling element includes a tapered pin coupled to the surface; a disc coupled to a top surface of spherical plate; a link configured to couple to the tapered pin and the disc; wherein the disc limits the rolling and vertical translation of the spherical plate; and, wherein separation of the spherical plate from the plate assembly and rolling beyond the maximum tilt angle is prevented by a top surface of the spherical plate when coming into contact with, at least, portion of a disc bottom surface of the disc.

In certain embodiments, the rolling movement of the spherical surface enables a subject to maintain a horizontal and omnidirectional translation of a center of mass of the subject, substantially with zero expenditure of energy, during a constant velocity translation and against resistance in accelerated translation.

In certain embodiments, the spherical surface has a predetermined spherical rocker radius larger than a distance of a center of mass of a subject from the surface In certain embodiments, each of the spherical plate and the plate assembly have an extended forward length and the spherical plate cooperating with male spherical stops coupled to forward corners of the plate assembly to immobilize the spherical plate in response to any force which causes the spherical plate to tilt forward and rest on the spherical stops thereby facilitating mounting of the sitting platform by the subject.

In certain embodiments, the tapered pin cooperates with a second surface of revolution, which is generated by rotation of a involute curve, about a vertical centerline, and the second surface of revolution, which is a part of the spherical plate, so that any horizontal translation and accumulated slip of the spherical plate, relative to the plate assembly, at a spherical rocker zero position, is substantially eliminated and the mechanism returns to set rolling.

In certain embodiments, the mechanism further includes a sitting platform spacer configured between the sitting platform and the spherical plate to provide an extended forward tilt thereby facilitating a forward tilt of a pelvis and neutral posture of the subject while sitting on the sitting platform.

In certain embodiments, the mechanism further includes a translation limiter including a tapered pin and an involute contour surface of revolution of the spherical plate, wherein meshing of the tapered pin and the involute contour surface of revolution limits a horizontal translation of the spherical plate when at a neutral position.

In certain embodiments, the mechanism further includes two leaf springs configured to limit rotation of the spherical plate about a vertical centerline and, without a load, or with a load is applied to a forward portion of the sitting platform, to force the spherical plate to rest on two spherical stops at forward part of the plate assembly thereby enabling the subject to easily mount the mechanism.

In addition to the exemplary aspects and embodiments described above, further aspects and embodiments will become apparent by reference to the figures and by study of the following detailed description.

There is provided, in accordance with an embodiment, a strip mechanism including a top assembly and a middle assembly having at least two top side strips and at least one top central strip connecting the top assembly and the middle assembly to facilitate a predetermined directional movement of the top assembly relative to a location of the middle assembly, a bottom assembly having at least two bottom side strips and at least one central bottom central strip connecting the bottom assembly to the middle assembly thereby facilitating the middle assembly to roll in a direction perpendicular to a direction of motion of the top assembly, wherein the at least two top side strips, at least one central top strip, at least two bottom side strips and at least one bottom central strip are configured to assume a predetermined shape, to facilitate a substantially slip less rolling motion of the top assembly and middle assembly, wherein the top and middle assemblies move and roll in perpendicular directions thereby facilitating an omnidirectional and horizontal rolling and tilting motion of the top assembly in response to a force applied by a subject to top assembly.

In certain embodiments, the top and middle assemblies have a cylindrical surface facilitating the rolling motion.

In certain embodiments, the top assembly and the middle assembly include, a first cylindrical surface and a second cylindrical surface, having a predetermined rocker radius, which is larger than a distance of a center of mass of the subject from an upper surface of the bottom assembly; wherein the mechanism, at rest, is in stable equilibrium and the rolling occurs with substantially zero energy expenditure.

In certain embodiments, the mechanism further includes at least four flat, tangential to cylindrical surfaces stop surfaces configured to control a predetermined maximum tilt angle of the top assembly and the middle assembly.

In certain embodiments, the mechanism further includes a sitting platform, wherein the top surface of the top rocker being configured to provide an increased forward tilt of the sitting platform, thereby facilitating a forward tilt of a pelvis and neutral posture of a subject while the subject is sitting on the sitting platform.

In certain embodiments, each of the top assembly and bottom plate having an extended length and the top assembly cooperating with male spherical stops coupled symmetrically to forward portion of the bottom assembly to immobilize the top assembly in response to any force tilting the top assembly in forward direction of the top assembly thereby facilitating mounting of the sitting platform by the subject.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIG. 24 schematically illustrates a lug hole enabling a free motion of a retaining pin following a single set rolling path, according to certain embodiments. Set rolling is a rolling motion without slip;

FIG. 25 schematically illustrates two sets of the retaining pin key positions, which are two end pin positions and the zero-pin position. The first set marked by solid lines relates to new cylindrical rocker and the other set relating to one having a predetermined wear, according to certain embodiments:

FIG. 26 schematically illustrates the two curves that determine a shape of a lug hole that enables free motion of a retaining pin when a range of paths is followed, according to certain embodiments;

FIG. 27 schematically illustrates a modified lug hole shape, made of the two curves being connected by two line segments, according to certain embodiments;

FIG. 28 schematically illustrates a side view of a retaining lug with a modified lug hole, the retaining pin and the cylindrical rocker, according to certain embodiments;

FIG. 29 schematically illustrates a side view of the retaining lug with the modified lug hole, according to certain embodiments;

DETAILED DESCRIPTION

Disclosed herein is an active sitting mechanism utilized in a sitting assembly to facilitate active sitting of a subject, according to certain embodiments. The active sitting mechanism operates according to a slip-less, omnidirectional rolling and tilting motion, which is centered about the active sitting mechanism's vertical axis and is defined by predetermined limiting parameters, such as a maximum angle tilt, maximum range of motion along horizontal and vertical planes, and the like. According to certain embodiments, the active sitting mechanism can include a spherical rocker mechanism 200, a cylindrical rocker mechanism 300, an easy mount mechanism or a combination thereof. In certain embodiments, the active sitting mechanism, can be stable in all positions tilt angles, and/or the like, with, substantially, zero expenditure of energy occurring from the movement of the user body and the active sitting mechanism. Motion caused by an application of force to the active sitting mechanism is reactive to a movement of the subject.

After mounting onto the sitting mechanism, the subject assumes a neutral posture with a center of mass of the subject located close to a z-axis. From the neutral position, the subject can engage in movements resulting in omnidirectional and horizontal translations of the center of mass. The translations coincide with movements of the pelvis of the subject. The pelvis movement requires activation of the core muscles of the subject. The translation of the center of mass can be performed at constant velocity and then the motion is substantially with zero expenditure of energy and the benefit is low intensity exercising of core muscles. In certain embodiments, the translation of center of mass can be performed with acceleration resulting in the motion involving resistance, which exercises the core muscles more intensively.

Figure 1:
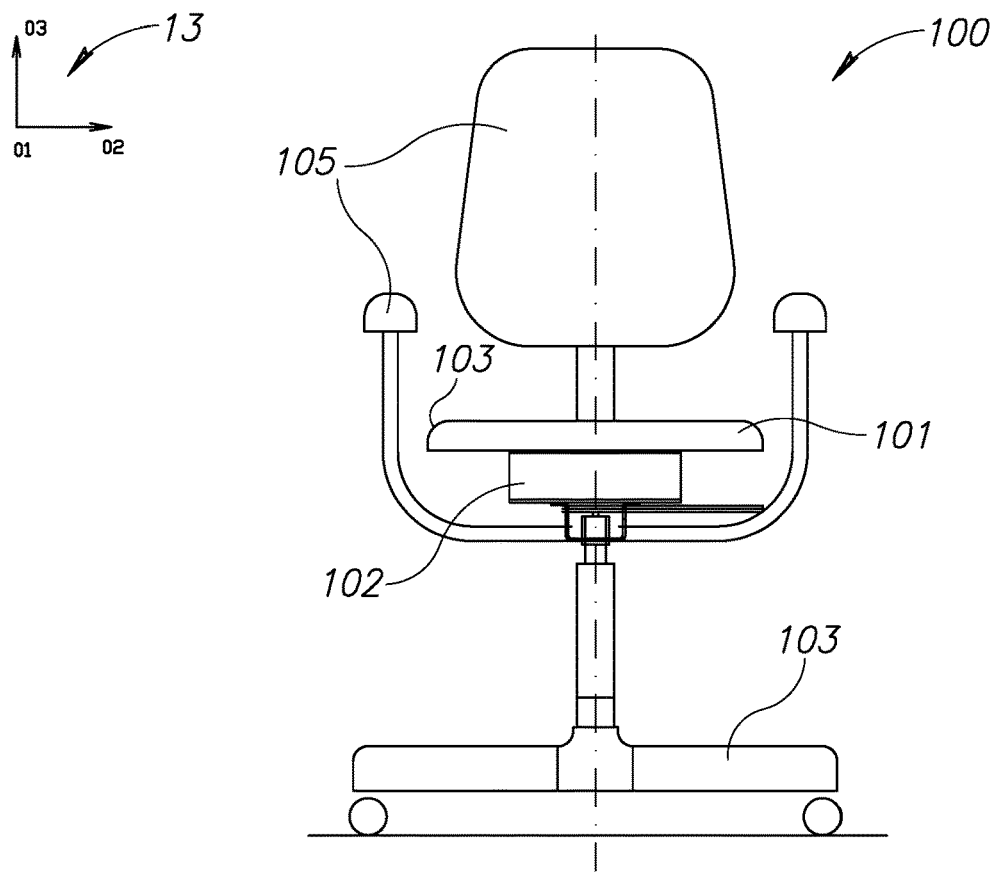
FIG. 1 schematically illustrates a front view of an active sitting device having an active sitting mechanism, according to certain embodiments.

FIG. 1 schematically illustrates a front view of an active sitting device 100 having an active seat mechanism 102, according to certain embodiments. Active sitting mechanism 102 provides coupling of a sitting platform 101 and a sitting base 103, for example, as an office chair base. Active sitting mechanism 102 is configured to perform a set rolling and tilting motions defined by predetermined parameters, such as a maximum angle tilt, maximum range of motion along horizontal and vertical planes, and the like. It, also, is configured to allow a subject of active sitting device 100, to perform frequent and controlled movements of a lumbar region of the subject close to a neutral posture position of the subject. These movements require adjustment of core muscles and small facet joints of a spine of the subject to control the coinciding movements of a pelvis of the subject and active sitting mechanism 102.

In certain embodiments, active sitting device 100 can include a back rest 105, which can be configured to not interfere with the free motion active sitting of the subject and can be configured to provide support when passive sitting is desired. Active sitting mechanism 102 can be aligned, for reference and illustrative purposes, on a Cartesian axis system 13 including an x-axis 01, a y-axis 02, and a z-axis 03 to provide reference to the movement direction of the components of active sitting mechanism 102.

Figure 2:
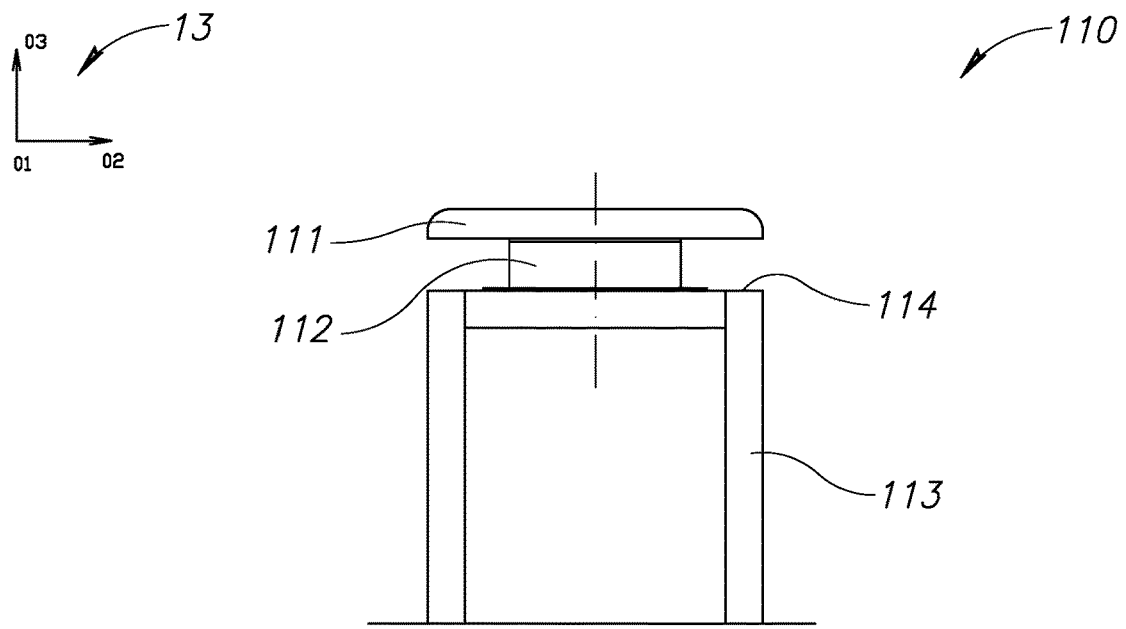
FIG. 2 schematically illustrates a front view of an active sitting device coupled to a sitting platform and a base, according to certain embodiments.

FIG. 2 schematically illustrates a front view of an active sitting device 110, with active sitting mechanism 112 coupled to a sitting platform 111 not having a back rest and resting on a mechanism base 113, according to certain embodiments. Mechanism base 113 can include a horizontal surface 114. In certain embodiments, a lack of a back rest requires muscles activation of the core muscles of the subject and small facet joints without providing an option for passive sitting.

Figure 3:
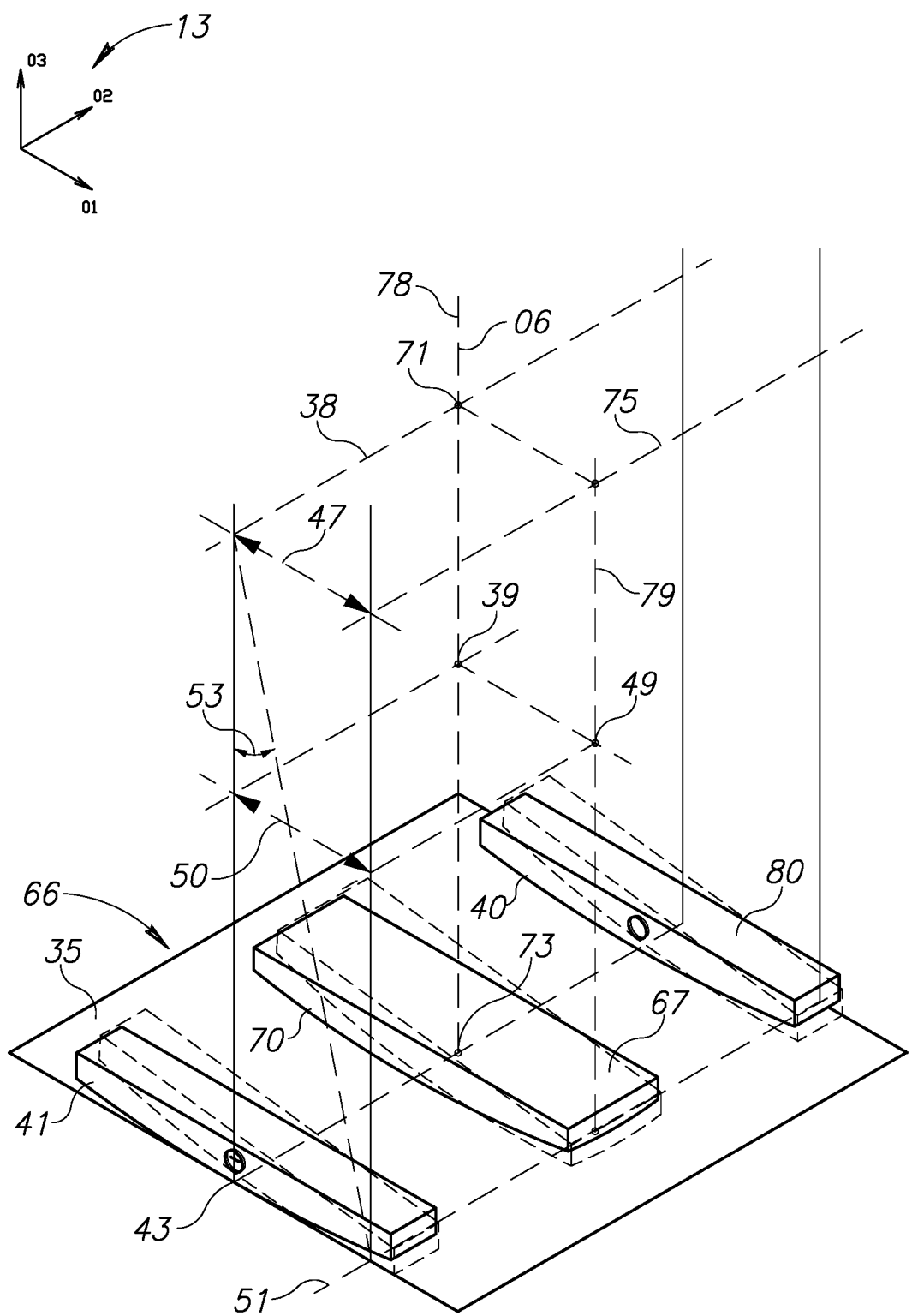
FIG. 3 schematically illustrates the stability and zero energy expenditure characteristic of active sitting mechanism, according to certain embodiments.

FIG. 3 schematically illustrates stability and zero-energy expenditure characteristics of an active sitting mechanism 66, according to certain embodiments. The stability and zero-energy expenditure characteristics apply to both spherical rocker mechanism 200 of FIGS. 4-8 and cylindrical rocker 300 of FIG. 12-23. Stability can be defined as the capacity of a mechanism with a load, to return to equilibrium after disturbance. In some cases, only one vertical force is applied to active mechanism 66, which acts and passes through center of mass position 39. Therefore, the disturbance is caused by change of location of the load and the center of mass. For a system to be stable, the disturbance must create a torque or force that will return the system to equilibrium.

Spherical rocker 67 is superimposed on at least one cylindrical rocker 41 In certain embodiments, cylindrical rocker 41 is divided into two rockers. Sphere center 71 is placed on cylinder axis 38. Both types of rockers contact the rolling surface 35 along contact line 43. Contact point 73 is on contact line 43. The predetermined position of the cylinder axis 38, with the sphere center 71, is above center of mass position 39. Different subjects can have a different center of mass position, which requires designating the highest center of mass position that will allow the widest range of subjects to use active sitting mechanism 66. Rocker radius 82 is defined as the distance of cylinder axis 38 from the rolling surface 35. Both rockers have the same rocker radius 82. Both rockers share the same center of mass position 39 and have a common top surface 80. Under these conditions, namely, same rocker radius 82 and same mass position 39, the stability behavior and energy expenditure will be the same. In certain embodiments, a very thin slice through the center of the spherical rocker 67, in any direction, can closely approximate a thin slice of cylindrical rocker 41, sliced in the rolling direction.

A general condition for equilibrium of either rocker is fulfilled when a vertical line 78 is drawn through center of mass position 39 and the cylinder axis 38 intersects vertical line 78. Vertical line 78 intersects the rolling surface 35 at contact point 73. These requirements for equilibrium are fulfilled in the initial stage. In the second stage, the equilibrium is disturbed. The center of mass 39 moves to center of mass new position 49. The applied force moves with the center of mass 39. Now it is not above the contact point 73 and creates a torque about contact point 73. This torque forces the rocker and the cylinder axis 38 to roll in the direction of the vertical line in new position 79. In the third stage the cylinder axis 38 moves toward cylinder axis new position 75 until it intersects the vertical line in new position 79. The disturbance created a torque that brought the rocker to new equilibrium in a different location relative to cartesian coordinates 13, at which location active sitting mechanism 66 is stable. Both the spherical rocker 67 and the cylindrical rocker 41 are stable not in one specific point but in any location within the limits of maximum tilt angles 45 of top surface 80. In certain embodiments a sitting platform 111 is coupled to top surface 80.

To regain equilibrium and bring cylinder axis 38 to intersect vertical line 78, the exemplary cylindrical rocker 41 has to roll by disturbance angle 53 to translate cylinder axis 38 by same distance by which center of mass 39 moved. This means that disturbance angle 53 is proportional to center of mass travel 50. As the disturbance angle 53 is equal to change of top surface 80 tilt angle, the meaning is that the change and direction of tilt angle of top surface 80 is linearly proportional to center of mass travel and direction of travel. In certain embodiments, the subject intentionally initiates the disturbance or center of mass travel 50 as means to control the position of sitting platform 101.

When the exemplary cylindrical rocker 41 rolls, the cylinder axis 38 moves in parallel with rolling surface 35, which is, predetermined to be horizontal. As long as a subject does not change center of mass position 39, relative to cylinder axis 38, center of mass position 39 moves in parallel with rolling surface 35, which results in no change in potential energy, which in turn means, substantially, zero energy expenditure at constant velocity rolling. Even in zero energy expenditure, the motion, by itself, provides low intensity exercising of the core muscles. Accelerated rolling results in resistance, which can exercise the core muscles and tissues of the subject, more intensively.

Figure 4:
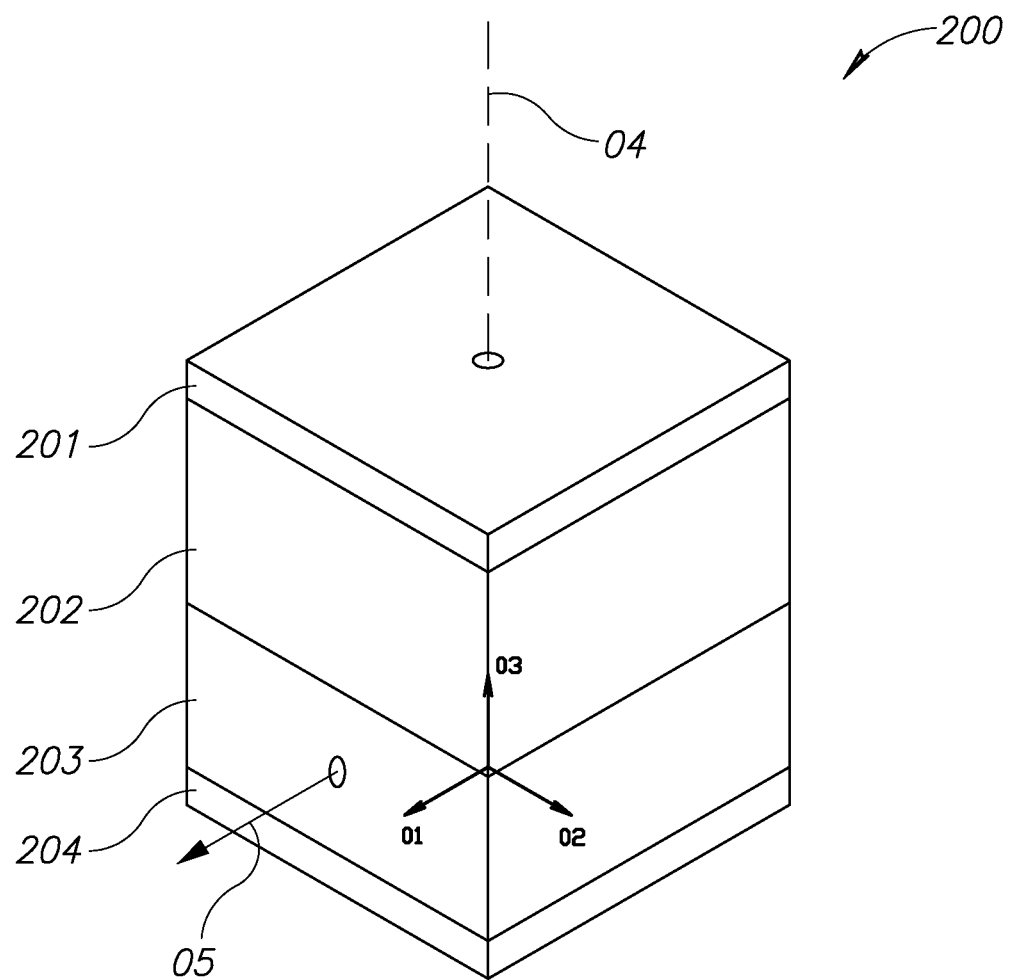
FIG. 4 schematically illustrates a spherical rocker mechanism, according to certain embodiments.

FIG. 4 schematically illustrates a spherical rocker mechanism 200 of active sitting mechanism 66, according to certain embodiments. Spherical rocker mechanism 200 is arranged, for reference purposes, along cartesian coordinates system 13 for purposes of defining movement directions of elements and components of spherical rocker mechanism 200 as described herein. A vertical centerline 04 of spherical rocker mechanism 200 is aligned with z axis 03, at spherical rocker zero position 230, for defining a reference motion of spherical rocker mechanism 200 and its components, for example, a forward tilting and rolling motion in direction 05, moving along x-axis 01. Spherical rocker mechanism 200 comprises of sitting platform 201, spherical plate 202, plate assembly 203 and mechanism base 204.

Figure 5:
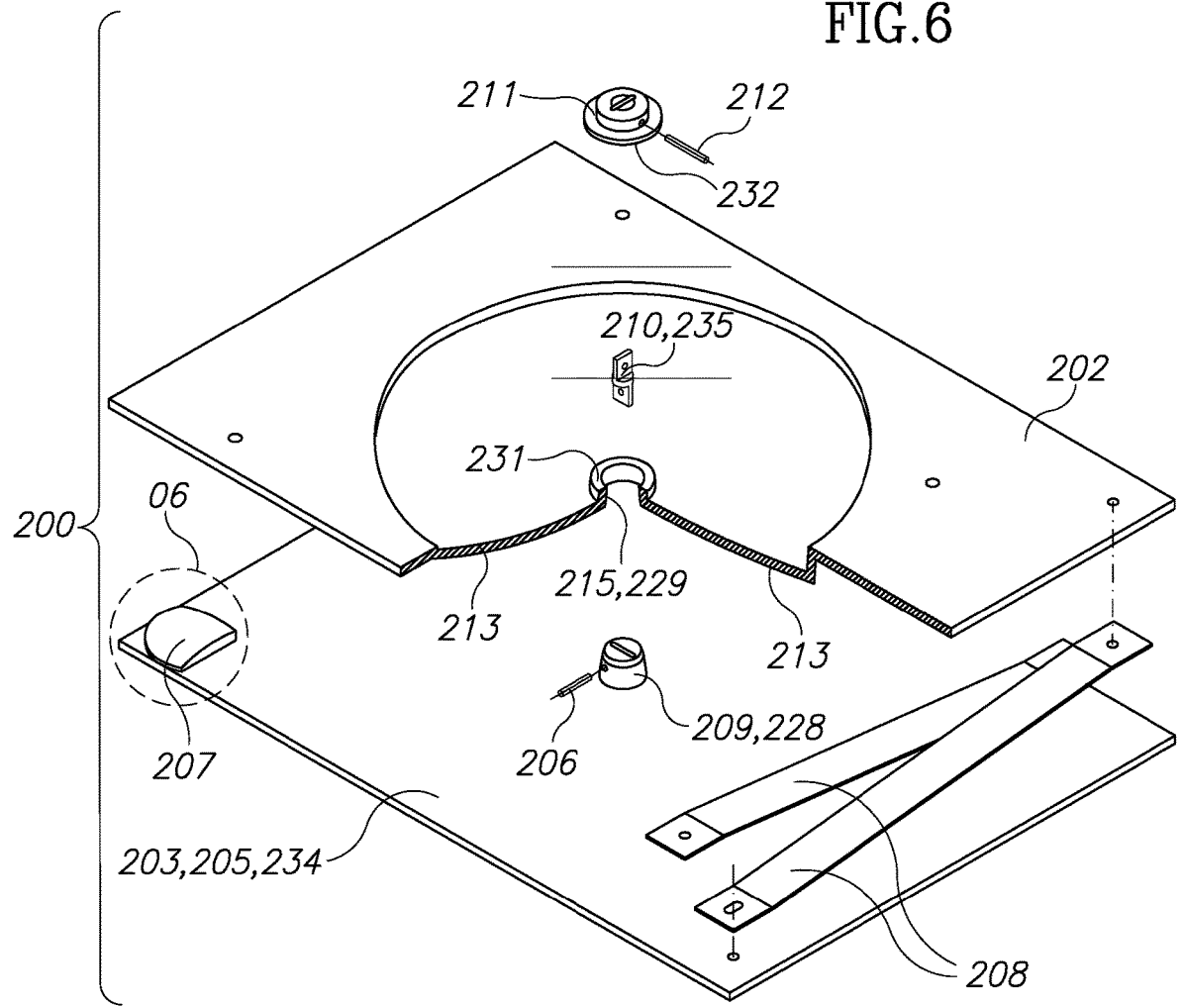
FIG. 5 schematically illustrates an exploded, isometric view of a spherical rocker mechanism, according to certain embodiments.

FIG. 5 schematically illustrates an exploded, isometric view of spherical rocker mechanism 200, according to certain embodiments. Spherical rocker mechanism 200 can be arranged coupling two sections of a sitting device 100 of FIG. 1, for example between a sitting platform 101 of FIG. 1 and a mechanism base 104 of FIG. 1. Spherical rocker mechanism 200 includes a spherical plate 202 having a spherical surface 213 and a plate assembly 203 having a surface. Spherical surface 213 is configured in a spherical shape to enable rolling and turning along the surface of plate assembly 203. In certain embodiments, the surface of plate assembly 203 is horizontal. Predetermined areas of spherical surface 213 are in contact with the surface of plate assembly 203. A flat portion of spherical plate 202 is in contact with the underside of sitting platform 201. In certain embodiments, the apex of spherical surface 213 can make tangential contact with the surface of plate assembly 203 at a predetermined contact area of plate assembly 203. Together, sitting platform 201 and spherical plate 202, can rotate and tilt with respect to plate assembly 203 to achieve the movement required for user to activate muscles and facet joints of the spine. In certain embodiments, rolling of spherical surface 213 atop plate assembly 203 results in tilting of spherical plate 202, such that a tilting angle and direction changes according to the rolling distance and direction.

Spherical plate 202 and plate assembly 203 are coupled together by a coupling element 235. Coupling element 235 can includes a tapered pin 209 and a disc 211, which can adjust omnidirectionally to the tilting position of top surface 231 and limits the tilt to maximum tilt angle 45. In certain embodiments, coupling element 235 includes link 210, which is coupled to tapered pin 209 by a first pin 206 and to disc 211 by a second pin 212. Link 210 is configured to rotate about tapered pin 209 in a first vertical plane and allows disc 211 to rotate in another vertical plane, which is perpendicular to the first vertical plane. In certain embodiments, coupling element 235 is a universal joint like element. Coupling of tapered pin 209, link 210 and disc 211 provides a plurality of functions, such as enabling tilting, rolling, rocking, wobbling, swiveling, and/or the like, of spherical plate 202 without spherical plate 202 disconnecting from plate assembly 203. In certain embodiments, spherical plate 202 can perform two types of rolling, such as radial rolling and a tangential rolling, radial rolling can include rolling away from z-axis 03 and tangential rolling can include rolling which maintains constant radius relative to z-axis 03 .

In certain embodiments, coupling element 235 limits the radial rolling of spherical plate 202 to a predetermined maximum tilt angle 45. When spherical plate 202 reaches maximum tilt angle 45, at least part of top surface 231 comes into contact with disc bottom surface 232 so that disc 211 prevents further rolling of spherical plate 202 thereby allowing spherical plate 202 to roll only tangentially.

In certain embodiments, when tapered pin 209 meshes with an involute contour surface 215 of the spherical plate 202 at spherical rocker zero position 230, the meshing is, with substantially no gap between the two, so that any results of possible slip of the spherical plate 202 relative to plate assembly 203 is eliminated. In spherical rocker zero position 230, spherical plate 202 is at zero tilt. In certain embodiments, plate assembly 203 can include a couple of male spherical stops 207 positioned on a top surface of plate assembly and at the forward corners thereof. Spherical stops 207 eliminate the tangential rolling when the spherical plate 202 is in full forward position. The spherical surfaces of spherical stops 207 enable stopping of spherical plate 202 in a plurality of tilt directions. Spherical rocking mechanism 200 can include a couple of leaf springs 208 configured to limit a minimum rotation of spherical plate 202 about vertical centerline 04. In certain embodiments, leaf springs 208 force spherical plate 202 into full forward tilt when no load is applied to active sitting mechanism 66. The use of spherical stops 207 and leaf springs 208 can enable spherical rocker mechanism 200 to be configured to enable easy mounting of active sitting mechanism 66. In certain embodiments, subjects sit at the center of sitting platform 201. When the subject is slightly off center on sitting platform 201 can have a slight tilt. Some subjects may feel uneasy to sit down on a tilted sitting platform. The full forward tilt enables the subject to sit down at a forward area of sitting platform 201, which remains static and then slide to a mobile center.

Figure 6:
FIG. 6 schematically illustrates an isometric view of a detail of spherical stop coupled to plate top surface 234 of a spherical rocker mechanism, according to certain embodiments.

FIG. 6 schematically illustrates an isometric view of a detail of spherical stop 207 coupled to plate top surface 234 of spherical rocker mechanism 200, of active sitting mechanism 66, according to certain embodiments. The stop curvature enables spherical plate 202 to make contact with plate assembly 203 at a plurality of angles.

Figure 7:
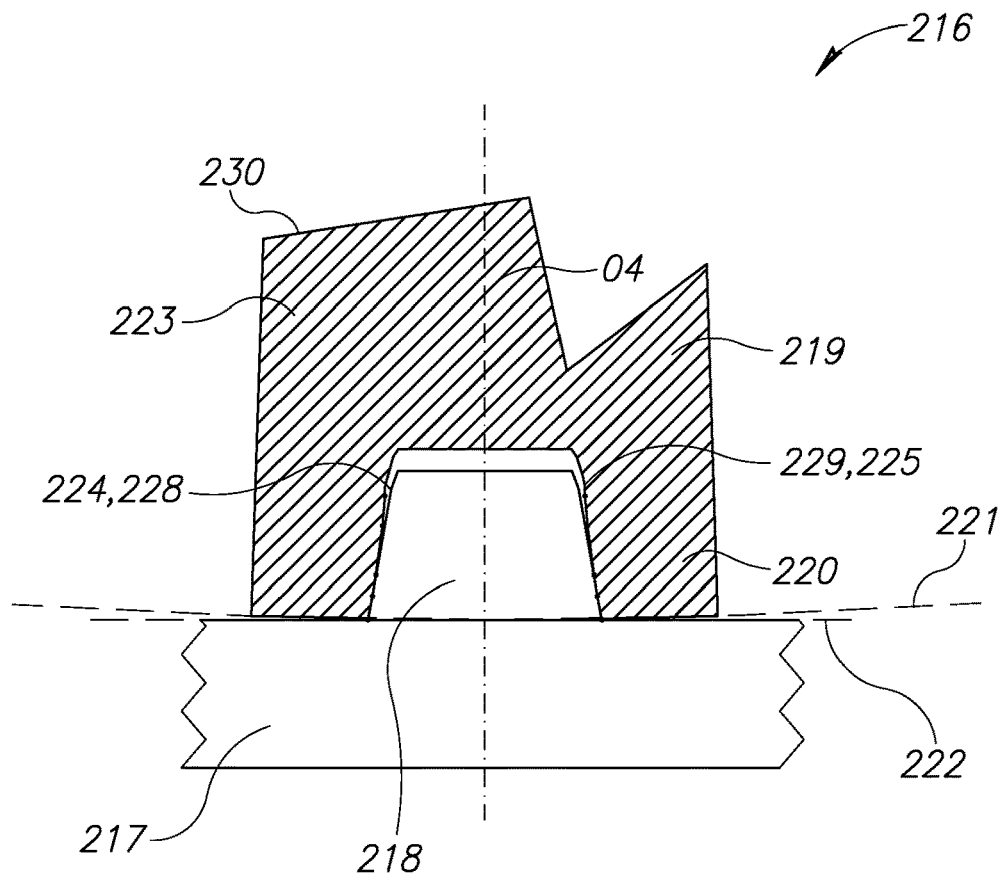
FIG. 7 schematically illustrates a gear and rack model, on which elimination of the results of horizontal slip in spherical rocker embodiment, according to certain embodiments.

FIG. 7 schematically illustrates a gear and rack model or gear model 216, which is configured to limit the horizontal slip and translations of spherical rocker 67, according to certain embodiments. In friction-based solutions, slip can occasionally occur, but should be limited and not be accumulative. To achieve such effect, in certain embodiments, spherical rocker mechanism 200 can include an element, which limits the horizontal translation and slip of the spherical plate 202 over plate assembly 203. The element can restore the set rolling motion. It is a characteristic of active sitting mechanism 66, that the rocker tilt angle is linearly related to horizontal center of mass travel 50. This linear relation exists most of the time and is affected by friction between the spherical rocker 67 and a rolling surface 35.

In certain cases, slip may occur in friction solutions. In certain embodiments, to prevent slip a gear 219 can roll on a rack 217 with no possibility of slip. A gear model 216 is similar to active sitting mechanism 66 in involving rolling of a gear with pitch circle 221 over a rack datum line 222. A gear and rack solution can be expensive and is configured to handle, mainly, forces tangential to gear 219 and is not omnidirectional. In active sitting mechanism 66, a force applied can be radial to the gear, which can cause high contact stresses. In a first modification, to prevent stresses, spherical surface 213 transfers the applied force to the plate 205, and not gear 219 to rack 217.

The second modification limits the numbers of teeth of the rack 217 and the gear 219. Maximum tilt angles 45 of active sitting mechanism 66 are relatively small, for example, less than 15 degrees. An exemplary maximum tilt angle 45, in one direction, can be 10 degrees, so that the total meshing occurs along 20 degrees. In certain embodiments, the translation can be limited using a model of a rack 217 having a single rack tooth 218, which meshes with two gear half teeth 220. These are part of an apex of spherical plate 202. Standard gear 219 and rack 217 could mesh through the whole maximum tilt angle 45. Gear 219 and rack 217 are special and meshing and no slip condition exist only close to the gear zero position 223. When slip exists, during the rolling of the spherical rocker 67, close to gear zero position 223, the slip becomes zero and the rolling returns to the set rolling motion. Slips of active sitting mechanism 66 are rare and occur under special conditions. The set rolling motion is maintained, according to parameters of active sitting mechanism 66. The second modification brings the number of teeth to minimum and makes the solution economical.

The meshing of the rack tooth with the gear two halves occurs in a plane. To make the model omnidirectional it requires a third modification. In a plane, the rack tooth contour 224 is a straight line, with small correction at the top. A gear tooth contour 225 has a shape of an involute. These two contours mesh in a plane. For the model to be omnidirectional gear tooth contour 225 and rack tooth contour 224 must mesh in any plane. This meshing can occur if both contours are revolved about a common vertical centerline and create two surfaces of revolution. Rack tooth contour 224 generates the first surface of revolution 228 which is part of the surface of the tapered pin 209. Gear tooth contour 225 generates the second surface of revolution 229 which is part of the surface of spherical plate 202. When spherical plate 202 meshes with tapered pin 209, first surface of revolution 228 meshes with second surface of revolution 229. The meshing can occur in any direction to enable omnidirectional movement. At spherical rocker zero position 230 the meshing with tapered pin 209 is substantially with no gap between the two and if any such gap existed, along the rolling motion, because of slip, at zero position it is eliminated and spherical plate 202 can continue to perform the set rolling. The omnidirectional meshing configuration has the advantage of relatively low contact stresses between tapered pin 209, or the first surface of revolution 228 and the second surface of revolution 229. Spherical plate 202 rolls on a horizontal plane, which contains rack datum line 222. Spherical rocker mechanism 200 is based on gear model 216. In certain embodiments, spherical rocker mechanism 200 can fulfill the requirement of not accumulating random slip results. In certain embodiments, rack 217 and gear 219 can have the following parameters: gear 219 and rack 217 have module 10 and pressure angle of 10 degrees. The gear teeth are part of gear 219 teeth with pitch diameter equal to twice a rocker radius, referenced by number 82. Rack tooth 218 includes only an addendum. The gear half teeth have only a dedendum.

In certain embodiments, rocker radius 82 can have values within a range of 300 to 7 M) millimeters, for example, a rocker radius 82 is 500 millimeter. In certain embodiments, tapered pin 209, link 210 and disc 211 enable limiting an upward translation of spherical rocker mechanism 200. Tapered pin 209 is attached to plate assembly 203.

Figure 8:
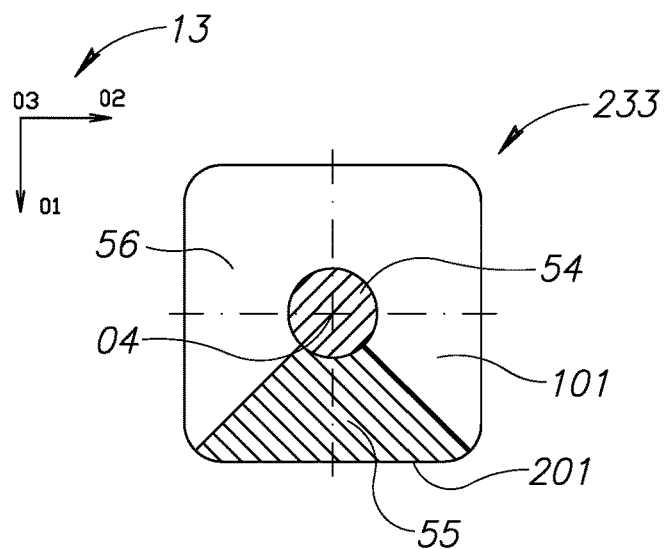
FIG. 8 schematically illustrates a mapping of possible motions of an active sitting mechanism having a spherical rocker mechanism as function of the location of the applied force, according to certain embodiments.

FIG. 8 schematically illustrates a mapping of possible motions of active seat mechanism 66 having a spherical rocker mechanism 200 of FIG. 4 as function of the location of the applied force, according to certain embodiments. When force is applied at the center of the sitting platform 201, at omnidirectional tilt area 54, sitting platform 201 can tilt omnidirectionally. When the force is applied to the forward stationary area 55 the sitting platform 201 cannot move at all, thus easing the mounting of the sitting platform 201 by the user. In the rest of a sitting platform 201 area the only possible motion is the tangential rolling, shown as tangential rolling area 56.

Figure 9:
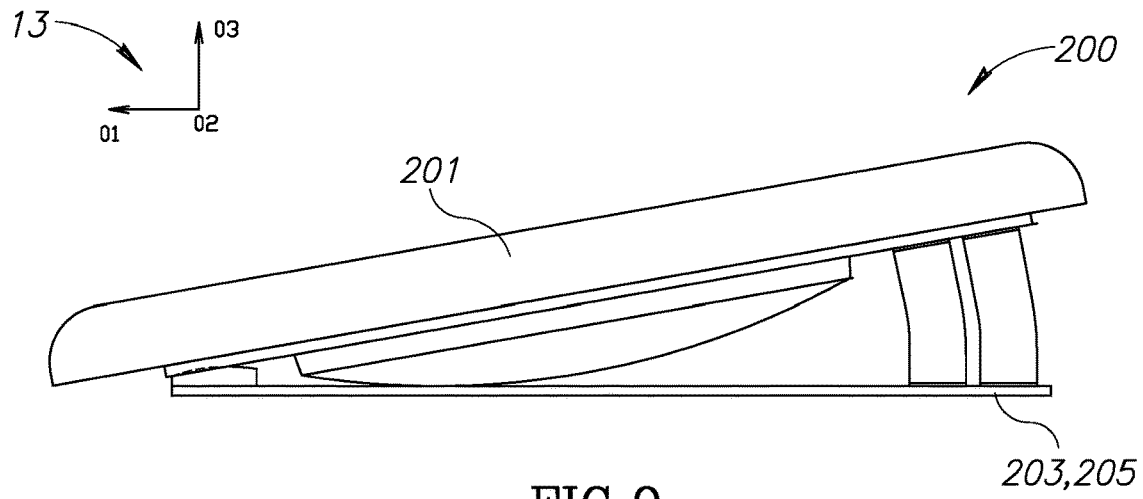
FIG. 9 schematically illustrates a side view along a negative y-axis, of a spherical rocker at a full forward tilt, according to certain embodiments.

FIG. 9 schematically illustrates a side view, along a negative y-axis, of a spherical rocker mechanism 200 at a full forward tilt. Spherical rocker mechanism 200 tilts and rolls along x-axis 01 so that spherical plate 202 is at a maximum tilt angle, reference by number 45, with plate assembly 203. The tilt and roll result from rotation of spherical surface 213 along the surface of plate assembly 203 resulting from a force applied onto spherical plate, for example, by the user when sitting on spherical rocker mechanism 200.

Figure 10:
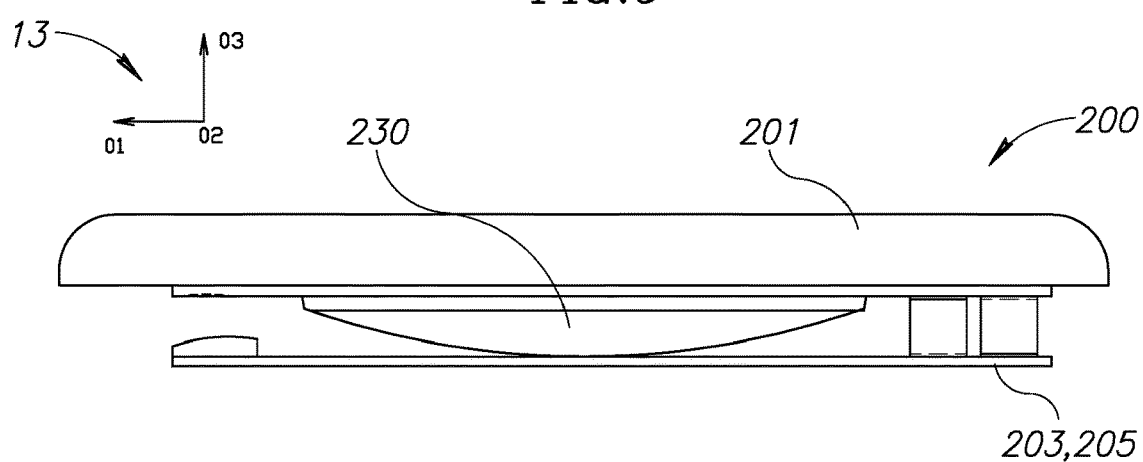
FIG. 10 schematically illustrates a side view along a negative y-axis of a spherical rocker at a zero-angle position, according to certain embodiments.

FIG. 10 schematically illustrates a side view along a negative y-axis 02 of spherical rocker mechanism 200 at spherical rocker zero position 230, according to certain embodiments. There is no tilt of spherical plate 202, which aligns parallel to plate assembly 203, for example, when external force is applied to spherical rocker mechanism 200 along vertical centerline 04.

Figure 11:
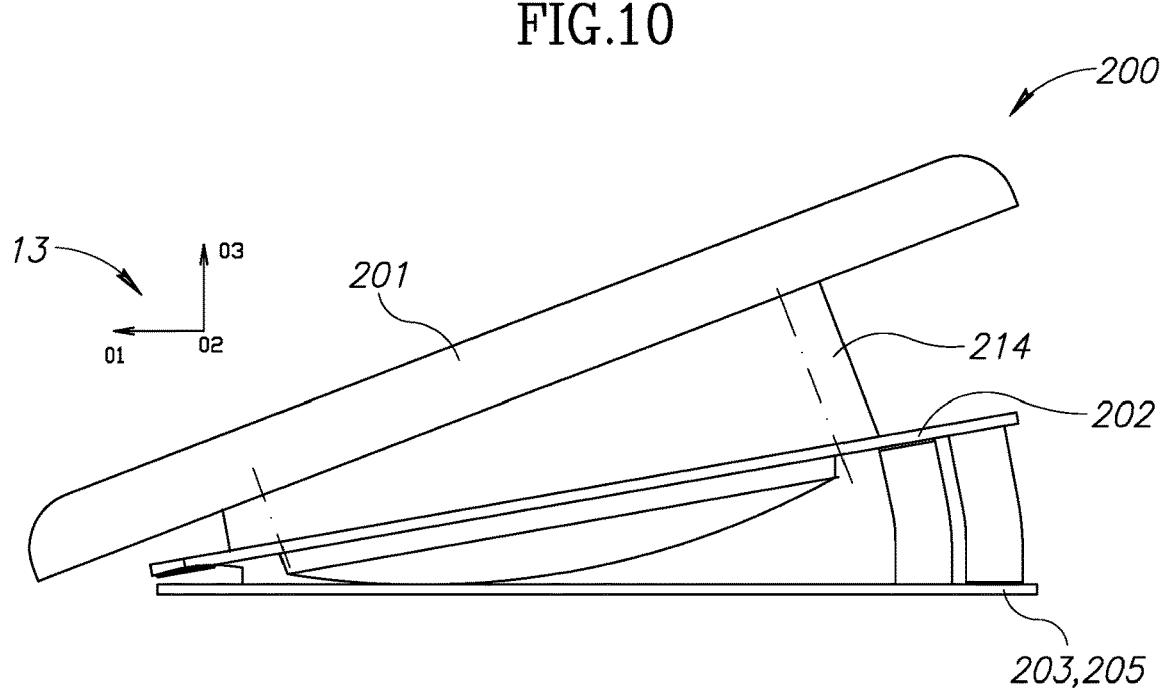
FIG. 11 schematically illustrates a side view along a negative y-axis of a spherical rocker in full forward tilt in a x-direction, including an additional sitting platform spacer, which increases the tilt in forward x direction at the expense of tilt in backward, negative x-direction, according to certain embodiments.

FIG. 11 schematically illustrates a side view in a negative y-axis axis 02 direction, of spherical rocker mechanism 200 in full forward tilt along x-axis 01, including an additional sitting platform spacer 214, which increases the tilt in forward x-axis 01 at the expense of tilt in backward, x-axis 01 direction, according to certain embodiments. Active sitting aims at encouraging the subject to move as much as practically possible, during the sitting sessions. Even small motions can be considered beneficial, and small frequent motions can be better.

An increased forward tilt results in pushing of the pelvis forward and forces the subject to adopt a neutral posture. Spherical surface 213 enables spherical plate 202 to make contact with plate assembly 203 at a plurality of angles, which allows rolling and tilting of spherical plate 202. The increased forward tilt angle is less than 30 degrees prevent the subject from sliding in, a forward x-axis 01 direction.

Figure 12:
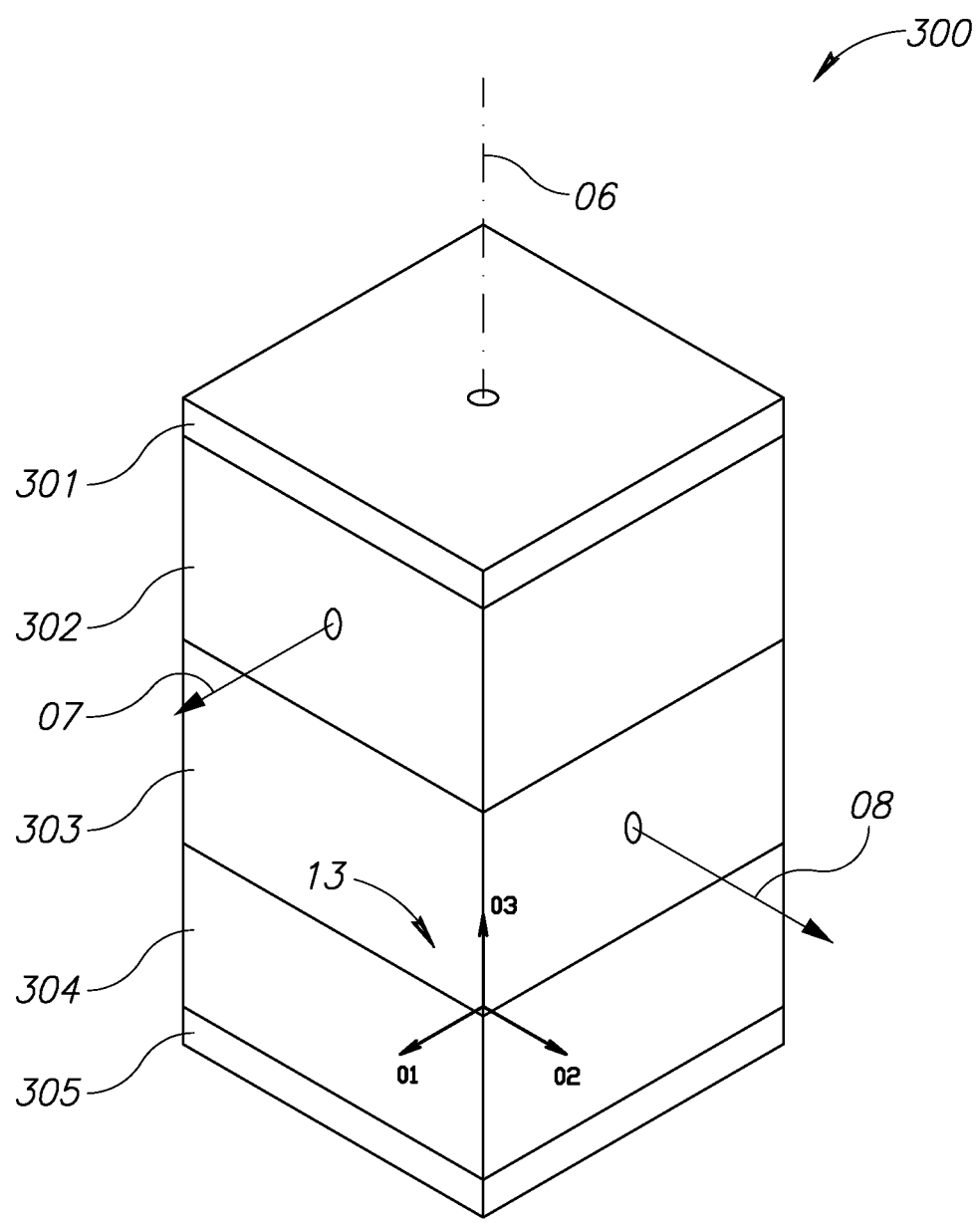
FIG. 12 schematically illustrates a cylindrical rocker mechanism, according to certain embodiments.

FIG. 12 schematically illustrates a cylindrical rocker mechanism 300, according to certain embodiments. In certain embodiments, cylindrical rocker mechanism 300 provides, a slip-less, omnidirectional, rolling motion in perpendicular directions. Cylindrical rocker mechanism 300 includes a top assembly 302, a middle assembly 303, and a bottom assembly 304. In certain embodiments, top assembly 302 is coupled to a sitting platform 301 and bottom assembly 304 is coupled to a mechanism base 305. Cylindrical rocker mechanism 300 is aligned with coordinate system 13 positioned at the bottom and center of bottom assembly 304 and the x-axis 01 is aligned with a forward direction, referenced by number 07. A vertical centerline 06 of cylindrical rocker mechanism 300 is aligned with z axis 03.

In certain embodiments, top assembly 302 rolls along an x-axis 01, for example forward direction 07, and bottom assembly 304 rolls along y-axis 02, or for example, a sideway direction 08, which enables tilting of top assembly 302, in all directions. In certain embodiments, cylindrical rocker mechanism 300 supports the subject, the pelvis angle of the subject which adjusts to the changing positions of the top assembly 302 and activates the core muscles and tissues.

Figure 13:
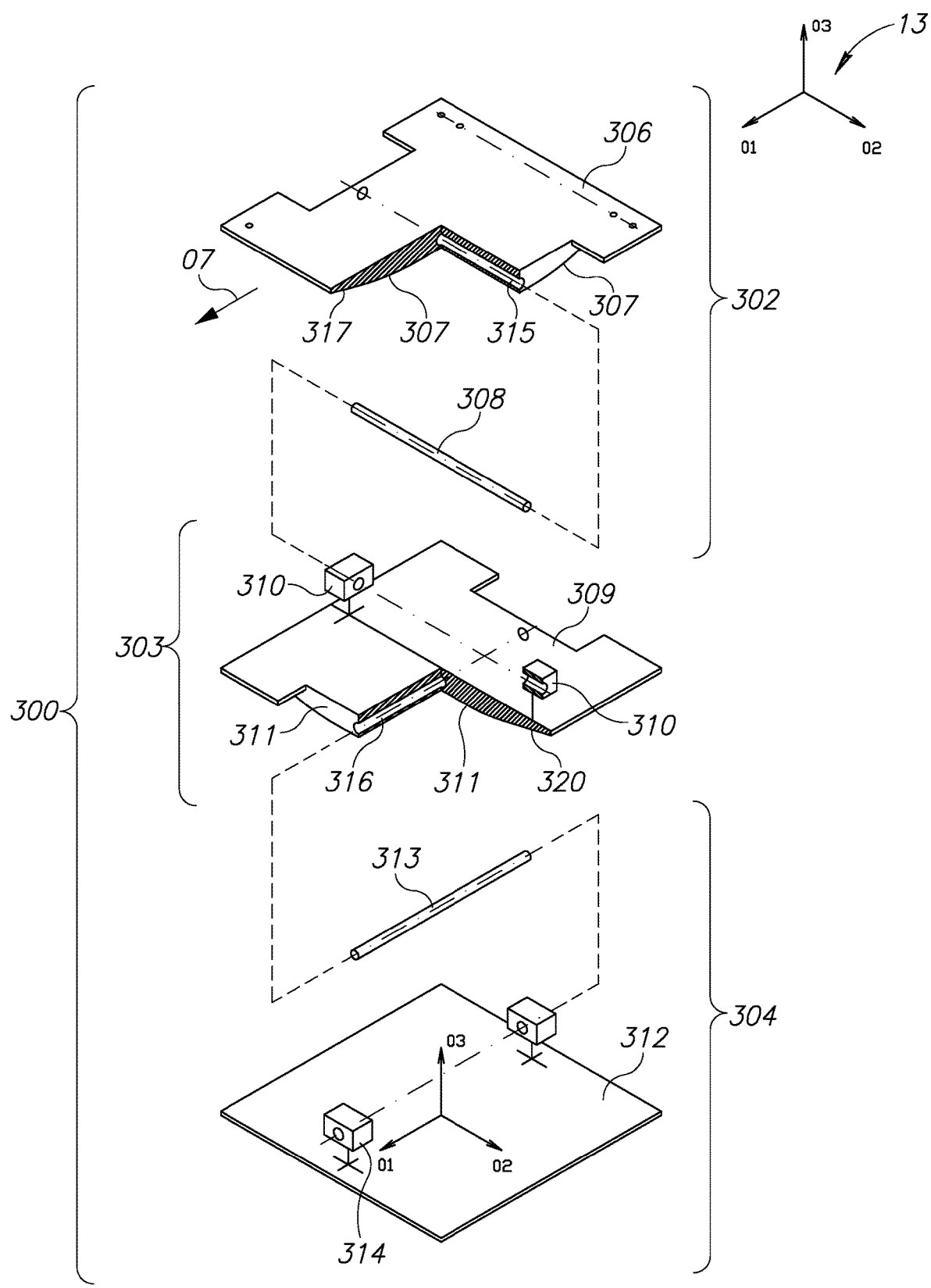
FIG. 13 schematically illustrates an exploded, isometric view of a cylindrical rocker mechanism, according to certain embodiments.

FIG. 13 illustrates an exploded, isometric view of cylindrical rocker mechanism 300, according to certain embodiments. Top assembly 302 includes a top rocker 306 having a first cylindrical surface 307 and a pair of two top tangential stop surfaces 317, which are tangential to cylindrical surface 307. Tangential stop surfaces 317 limit the tilt to a maximum tilt angle 45. Top assembly 302 includes a first cavity 315 in which a first pin 308 is inserted, to couple top assembly 302 to middle assembly 303. Middle assembly 303 includes two or more middle lugs 310, connected to a top surface 309, through which first pin 308 is inserted. First pin 308 enables top assembly 302 to rock and tilt in a predetermined direction in response to application of a force applied to cylindrical rocker mechanism 300. Middle assembly 303 includes a second cylindrical surface 311 and a pair of two middle tangential stop surfaces 320 which are tangential to a second cylindrical surface 311. Middle tangential stop surfaces 320 limit the tilt to maximum tilt angle 45. Middle assembly 303 includes a second cavity 316 through which a second pin 313 is inserted and couples with at least two bottom lugs 314 coupled to bottom assembly 312. Second pin 313 enables middle assembly 303 to rock and tilt in a predetermined direction in response to application of a force applied to cylindrical rocker mechanism 300. According to certain embodiments, first cylindrical surface 307 and second cylindrical surface 311 are substantially identical. In certain embodiments, middle lugs 310 and bottom lugs 314 are substantially identical.

Figures 14, 15:
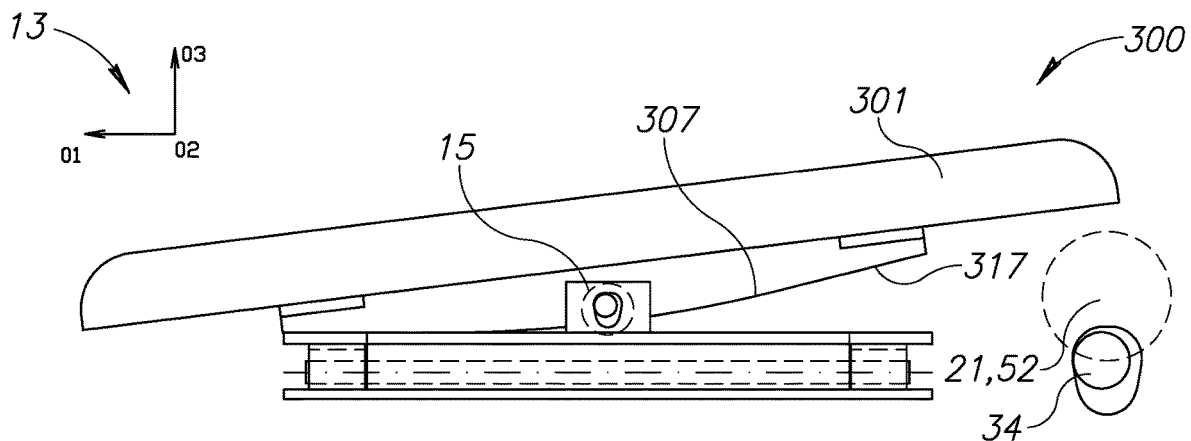
FIG. 14 schematically illustrates a side view along a negative y-axis of a cylindrical rocker mechanism in a full forward tilt in a x-direction, according to certain embodiments.
FIG. 15 schematically illustrates a side view detail of position of the retaining pin at a cylindrical rocker mechanism in a full forward tilt in a x axis direction, according to certain embodiments.
Figure 23:
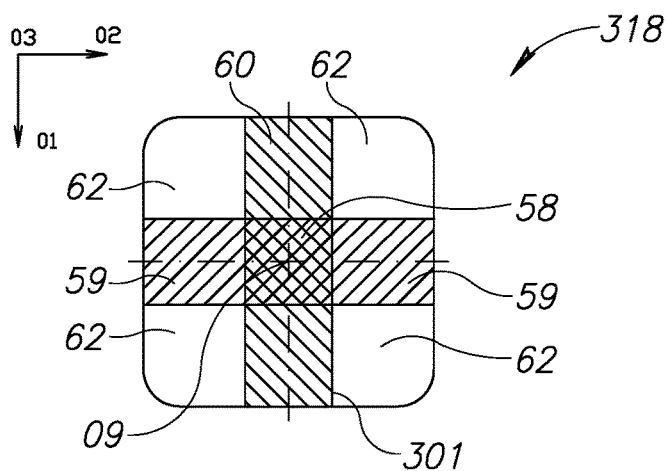
FIG. 23 schematically illustrates a mapping of possible motions of a cylindrical rocker mechanism as function of the location of the applied force, according to certain embodiments.

FIG. 14 illustrates a side view along a negative y-axis 02 of cylindrical rocker mechanism 300 in a full forward tilt in an x-axis 01 direction, according to certain embodiments. The forward tilt is the result of application of vertical force on the forward portion of the of cylindrical rocker mechanism 300. Application of a force on cylindrical rocker mechanism 300, depending on point of application, can cause one of four results as shown in FIG. 23.

In certain embodiments, cylindrical rocker mechanism 300 can include a sitting platform spacer 319, which increases the tilt of sitting platform 301 in forward x direction at the expense of tilt in backward, negative x direction FIG. 15 schematically illustrates a side view detail of position of retaining pin 34 at end pin position 52 when cylindrical rocker mechanism 300 is in a full forward tilt in a x-axis 01 direction, according to certain embodiments.

Figures 16, 17:
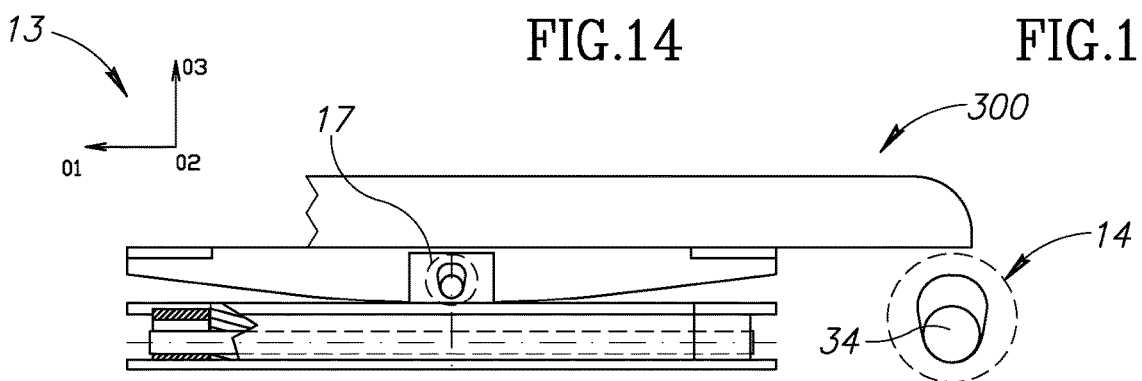
FIG. 16 schematically illustrates a side view along a negative y-axis of a cylindrical rocker mechanism in a zero position, according to certain embodiments.
FIG. 17 schematically illustrates a side view detail of position of the retaining pin at a cylindrical rocker mechanism in a zero position, according to certain embodiments.

FIG. 16 schematically illustrates a side view along a negative y-axis 02 of cylindrical rocker mechanism 300 in a zero position, according to certain embodiments.

FIG. 17 schematically illustrates a side view detail of position of retaining pin 34 at zero pin position 44 when cylindrical rocker mechanism 300 in a zero position, according to certain embodiments.

Figure 18:
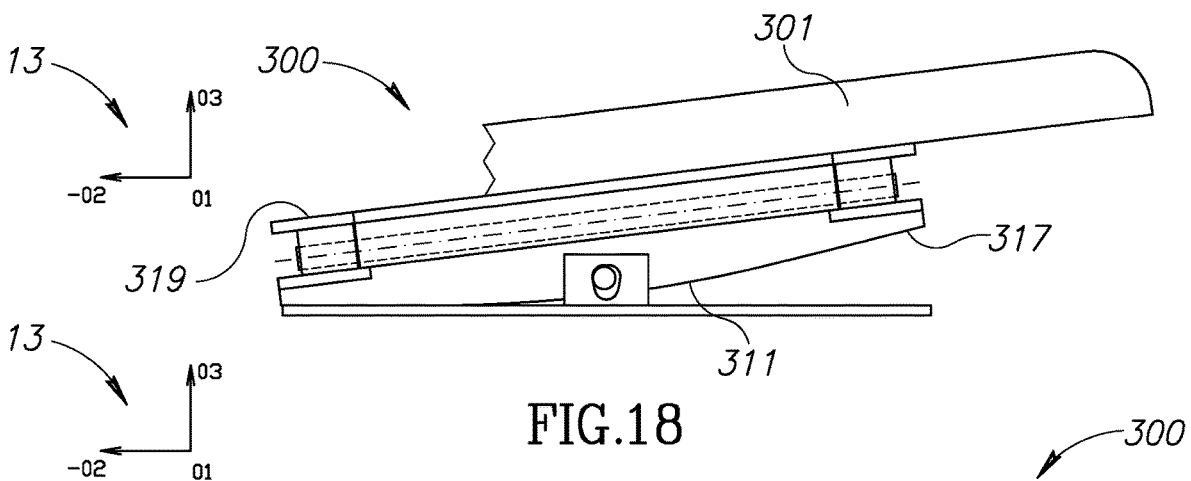
FIG. 18 schematically illustrates a front view, along an negative x-axis of a cylindrical rocker mechanism in full tilt in a negative y-axis direction, according to certain embodiments.

FIG. 18 schematically illustrates a front view, along negative x-axis 01 of cylindrical rocker mechanism 300 in full tilt in a y-axis 02 direction, according to certain embodiments. Middle assembly 303 tilts and rotates in a direction perpendicular to top assembly 302, and is illustrated in position of zero tilt, according to certain embodiments.

Figure 19:
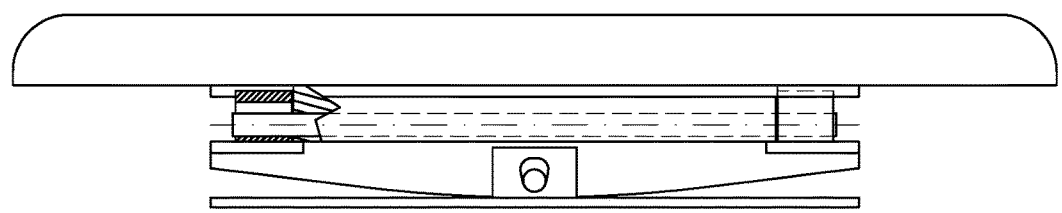
FIG. 19 schematically illustrates a front view, along an negative x-axis of a cylindrical rocker mechanism in a zero position, according to certain embodiments.

FIG. 19 schematically illustrates a front view, along a negative x-axis 01 of cylindrical rocker mechanism 300 in a zero position, according to certain embodiments. Both top assembly 302 and middle assembly are at a zero-position when force is applied to cylinder rocker mechanism 300 along a negative z-axis 03.

Figure 20:
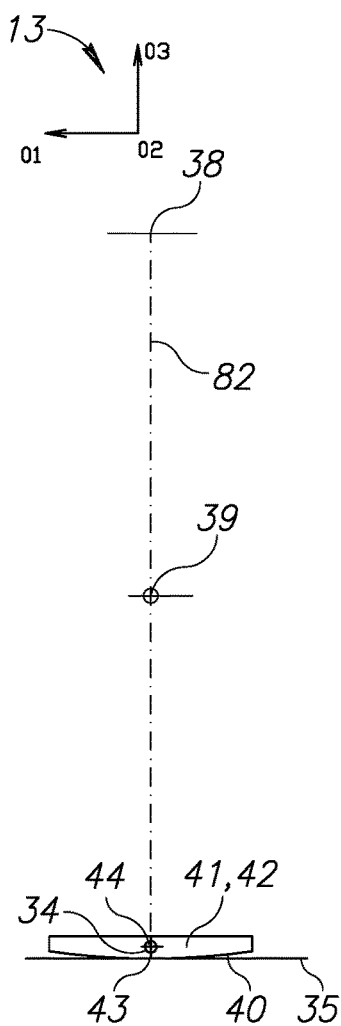
FIG. 20 schematically illustrates a side view of an exemplary cylindrical rocker and its retaining pin at zero position, as a first stage of a rolling motion, according to certain embodiments.

FIG. 20 schematically illustrates a side view of an exemplary cylindrical rocker 41 and retaining pin 34 at zero position, at a first stage of a rolling motion. A center of mass, referenced by number 39, is located along a vertical line positioned in a plane defined by cylinder axis 38 and contact line 43, which coincides, in zero position, with the y-axis 02. The distance between cylinder axis 38 and contact line 43 defines a, predetermined, rocker radius 82. Center of mass 39 of the subject should be below the cylinder axis 38. In certain embodiments, the x and y coordinates of center of mass 39, can determine the tilt angle and direction. For example, where center of mass 39 is positioned on z-axis 03, active sitting mechanism 66 is at a static zero-position. The following figures illustrate the stages of rolling motion from zero pin position 44 up to maximum tilt angle 45 and the rolling motion being broken into the two components: rotation, followed by translation.

Figure 21:
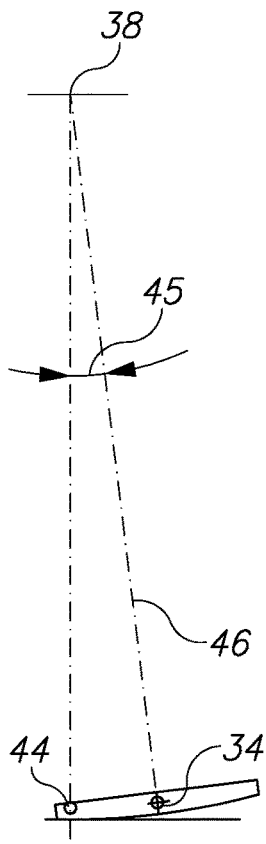
FIG. 21 schematically illustrates a second stage of a rolling motion of an exemplary cylindrical rocker, the stage of rotation, according to certain embodiments.

FIG. 21 schematically illustrates a second stage of a rolling motion of active sitting mechanism 66, the stage of rotation, according to certain embodiments.

Figure 22:
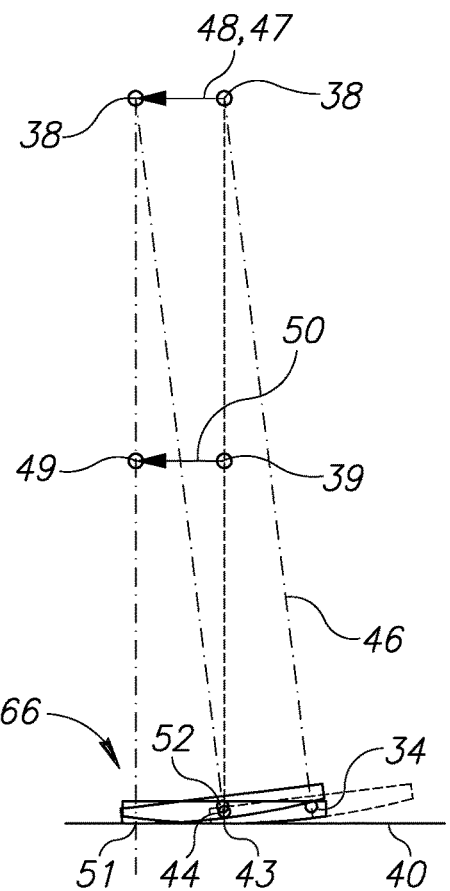
FIG. 22 schematically illustrates all stages of the rolling motion of general cylindrical rocker and the end position of the retaining pin relative to zero pin position, according to certain embodiments.

FIG. 22 schematically illustrates stages of rolling motion of general cylindrical rocker 41 and the end position of retaining pin 34 relative to zero pin position 44, according to certain embodiments. The motion is accompanied by cylinder axis travel 47 and center of mass travel 50. At the end of the motion the retaining pin 34 assumes an end pin position 52. As zero pin position 44 remained marked it can be compared with end pin position 52. In certain embodiments, the travel path of retaining pin 34 is small when compared to a travel path of center of mass, referenced by number 50. In certain embodiments, controlling the motion of the cylindrical rocker 41 can be achieved by relatively small retaining lug 26 having a small lug hole 24.

FIG. 23 schematically a mapping of possible motions of a cylindrical rocker mechanism 300 as function of the location of the applied force, according to certain embodiments. The omnidirectional tilt area 58 is located at the center of sitting platform 301. Tilt along x-axis area 59, is a forward tilt area of sitting platform 301. Tilt along y-axis area 60, is a side tilt area of sitting platform 301. In stationary area 62, sitting platform 301 does not move.

This cylindrical rocker mechanism 300 is not an easy mount version of the mechanism.

FIG. 24 schematically illustrates lug hole 24 enabling a free motion of a retaining pin 34 following a single path 23, according to certain embodiments. Single path 23 relates to motion of pin center 21 with rolling of a new cylindrical rocker 41. The shape of lug hole 24 is determined by key positions 22 of retaining pin 34. Lug hole 24 allows a predetermined amount of slip of cylindrical rocker 41. In certain embodiments, along the set rolling motion, lug hole 24 eliminates the results of slip and brings cylindrical rocker 41 back to the set rolling motion.

FIG. 25 schematically illustrates two sets of retaining pin key positions 22, the first set marked by solid lines relates to new cylindrical rocker 41 and the other set relating to one having a predetermined wear, according to certain embodiments. A lug hole 24 which has an upper section shaped to allow free motion of a new cylindrical rocker 41 and a bottom part shaped to allow free motion of cylindrical rocker 41 which has a predetermined wear, which provides a solution to the problem of cylindrical rocker 41 wear. Modified lug hole 24 enables a free motion in all in-between conditions of cylindrical rocker 41.

The applied load should be balanced by reaction of rolling surface 35 and not the reaction of lug hole 24. When cylindrical rocker 41 is worn or certain combinations of part manufacturing tolerances exist, the result is that the load is being supported by the lug hole 24. Failing to prevent such situation leads to loss of contact between the cylindrical rocker 41 and the rolling surface 35. Wear interferes with the no slip requirement and the functioning of active sitting mechanism 66. Wear of cylindrical rocker 41 causes the retaining pin 34 to move in z-axis direction. The critical point is at zero pin position 44. To reduce wear effects, retaining pin 34 is allowed to move in z-direction with no contact with bottom part of the lug hole 24. The modified shape of the bottom part of lug hole 24 ensures a proper functioning of active sitting mechanism 66 as long as the predetermined wear is not exceeded.

FIG. 26 schematically illustrates the two curves that determine a shape of lug hole 24 that enables free motion of retaining pin 34 when a range of paths, referenced by number 23, is followed, according to certain embodiments. A top curve 31 is made of two arcs having radius of retaining pin 34 and being centered at a path end, referenced by number 20, of top path, referenced by number 29. A bottom curve, referenced by number 30, includes points distanced away from bottom path 28 by radius of retaining pin 34.

FIG. 27 schematically illustrates modified lug hole 33 shape, made of the two curves being connected by two straight line segments, referenced by number 32, according to certain embodiments. A shape of modified lug hole 33 enables retaining pin 34 to move along any of paths 23 within the range defined by top path 29 and bottom path 28. As long as wear of cylindrical rocker 41 and accumulation of manufacturing tolerances do not exceed a predetermined value of offset, referenced by number 27, active sitting mechanism 66 can function. Dimensions of modified lug hole 33 are illustrated. In certain embodiments, retaining pin 34 can have a diameter within a range of 8-10 millimeters, for example, 8 millimeters, the dimensions of modified lug hole 33 are small but still allow a considerable translation of the cylindrical rocker 41.

FIG. 28 schematically illustrates a side, cross section, view of retaining lug 26 with modified lug hole 33, retaining pin 34 and cylindrical rocker 41, according to certain embodiments. A shape of modified lug hole 33 enables active sitting mechanism 66 to function as long as wear of a rolling element does not exceed a predetermined value.

FIG. 29 schematically illustrates a side view of retaining lug 26 with modified lug hole 33, according to certain embodiments.

Figure 30:
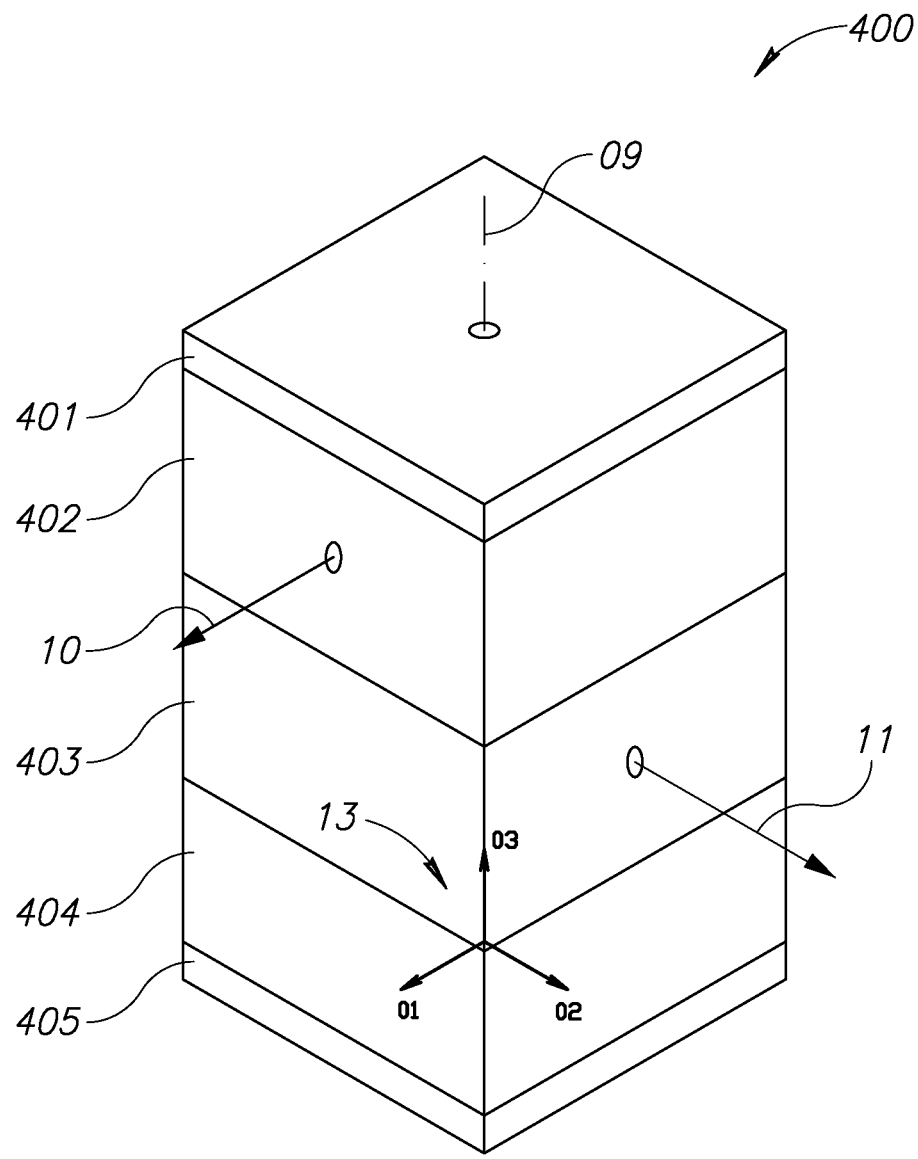
FIG. 30 schematically illustrates an easy mount mechanism, according to certain embodiments.

FIG. 30 schematically illustrates an easy mount mechanism 400, according to certain embodiments. Easy mount mechanism 400 includes a top assembly 402, a middle assembly 403 and a bottom assembly 404. In certain embodiments, top assembly 402 is coupled to a sitting platform 401, and bottom assembly 404 is coupled to a mechanism base 405.

Figure 31:
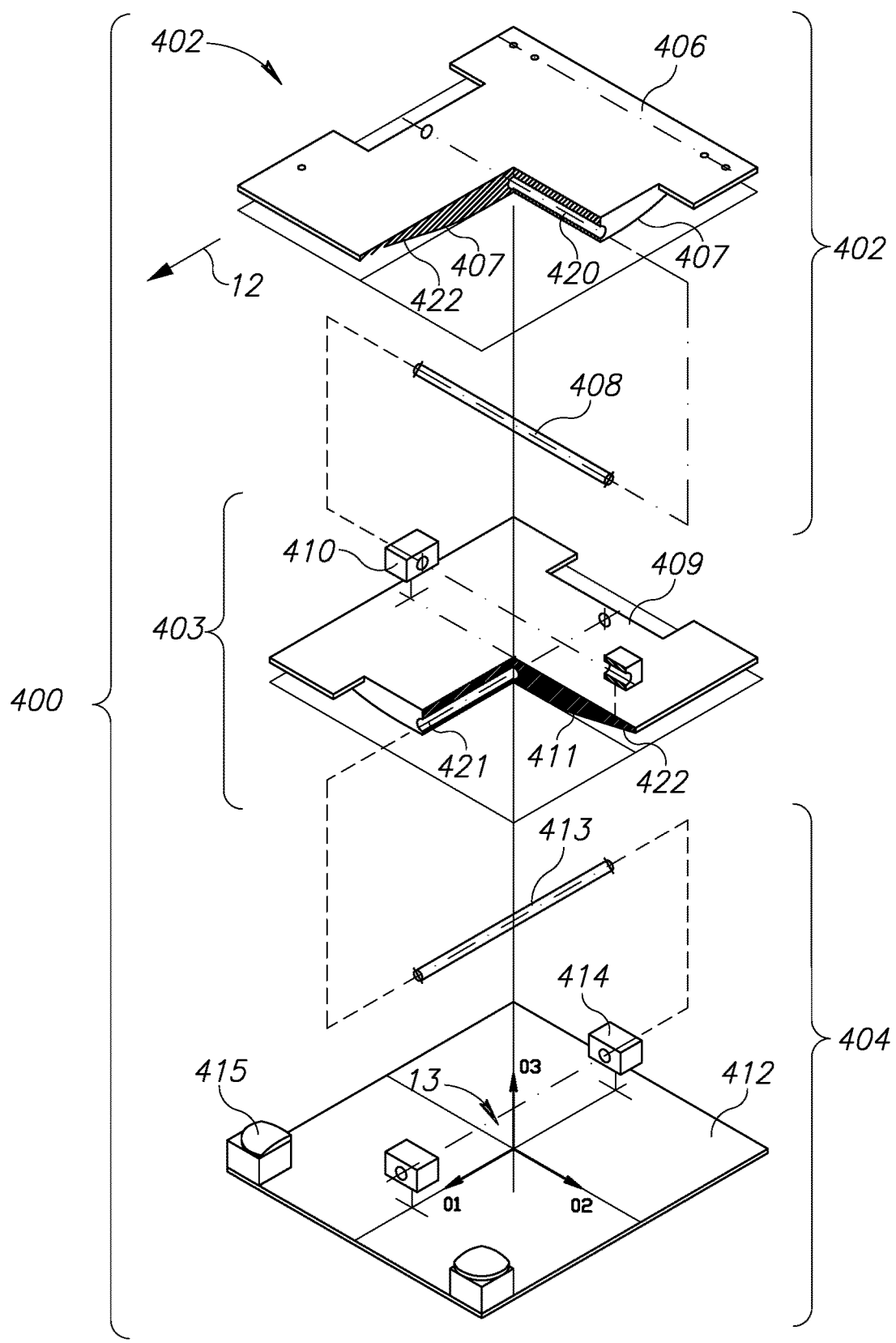
FIG. 31 schematically illustrates an exploded, isometric view of an easy mount mechanism, according to certain embodiments.

FIG. 31 schematically illustrates an exploded, isometric view of easy mount mechanism 400, according to certain embodiments. Top assembly 402 includes a top rocker 406 with extended forward portion and a first cylindrical surface 407. Top assembly 402 includes a first cavity 420 in which a first pin 408 is inserted. First pin 408 is coupled to two or more middle lugs 410 of middle assembly 403, which enable coupling top assembly 402 to middle assembly 403 and enable top assembly 402 to rotate and tilt along a forward direction 12 aligned with x-axis 01. A second pin 413 is inserted into a middle cavity 421 and is coupled to two or more bottom lugs 414 of bottom assembly 404 and enabling middle assembly 403 to rotate and tilt along sideway direction 11 along a y-axis 02. The bottom assembly 404 is configured to be horizontal and static. In certain embodiments, easy mount mechanism 400 is a variant of cylindrical rocker mechanism 300, top rocker 406 and horizontal plate 412 are extended in forward x-axis direction. Bottom assembly 404 includes two spherical stops 415 disposed at the two forward portion of horizontal plate 412. When load is applied to the forward part of easy mount mechanism 400, top assembly 402 tilts in forward x-axis direction and one of the forward corners meets one of the spherical stops 415. Further application of the load forces top assembly 402 to rest on both spherical stops 415. When subject sits on the forward part of sitting platform 401, it is immobile thereby making mounting onto easy mount mechanism 40X) easier for the subject by providing a steady mounting platform.

Figure 32:
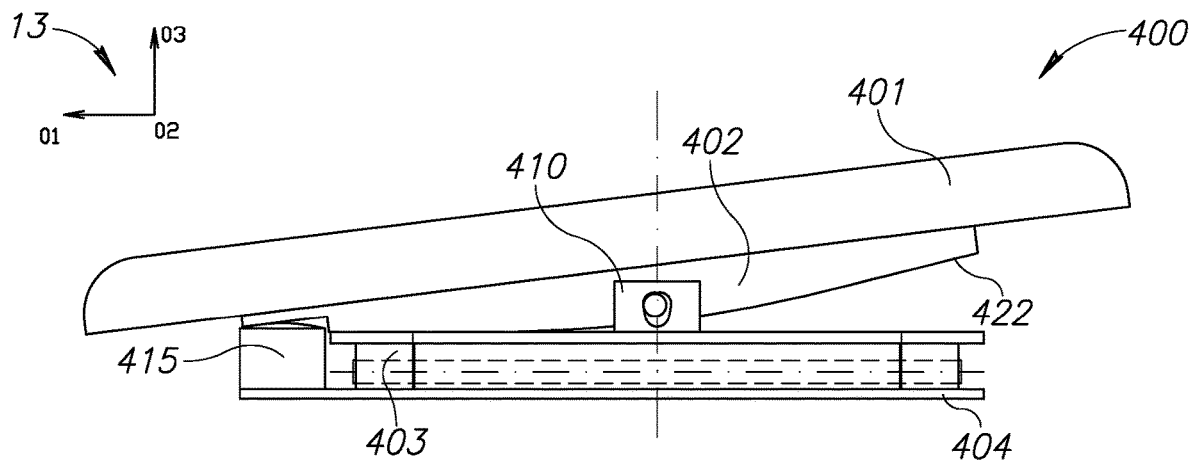
FIG. 32 schematically illustrates a side view along a negative y-axis of an easy mount mechanism in a full tilt in an x axis direction, according to certain embodiments.

FIG. 32 schematically illustrates a side view along a y-axis 02 of easy mount mechanism 400 in a full tilt in a positive x-axis direction with no sideway tilt, according to certain embodiments.

Figure 33:
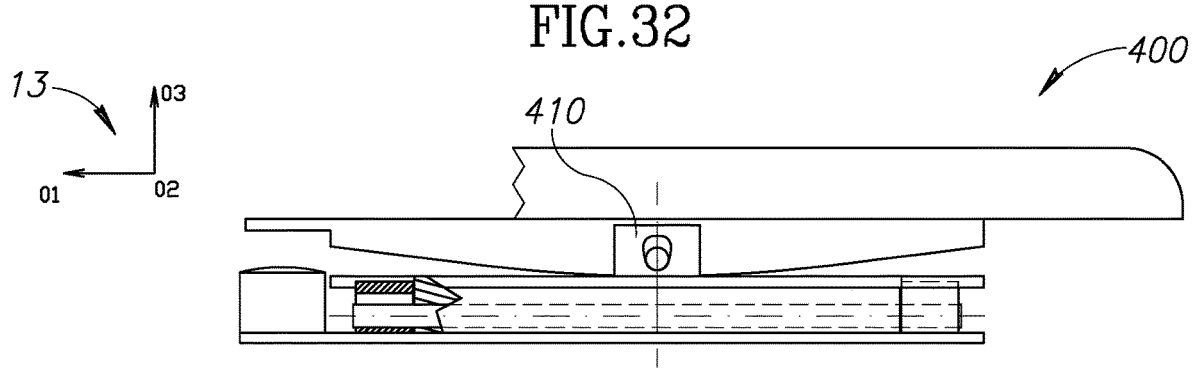
FIG. 33 schematically illustrates a side view along negative y-axis of an easy mount mechanism in a zero position, according to certain embodiments.

FIG. 33 schematically illustrates a side view along a negative y-axis of easy mount mechanism 400 in a zero position, according to certain embodiments. Such a position occurs when a force is applied to easy mount mechanism 400 along negative vertical centerline 09 coinciding with z-axis 03 .

Figure 34:
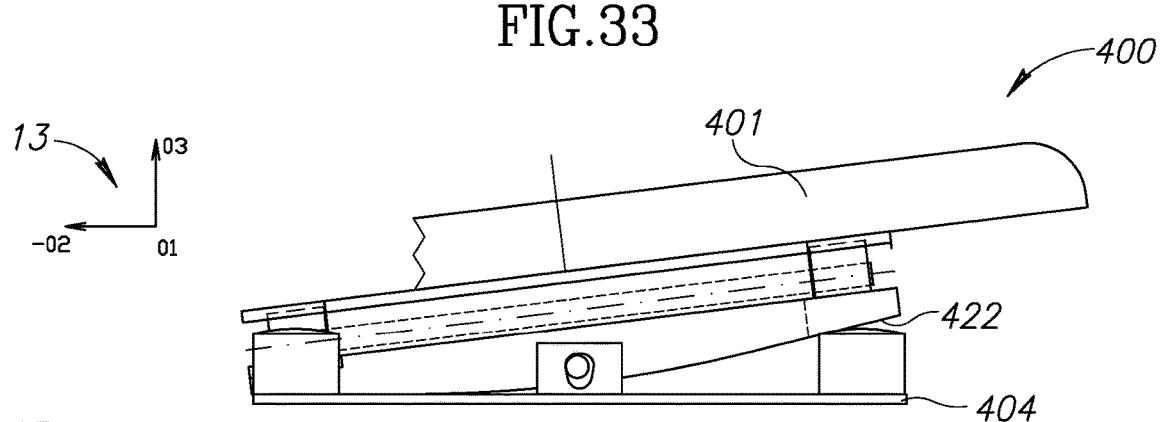
FIG. 34 schematically illustrates a front view along a negative x-axis of an easy mount mechanism in full side tilt in negative y-direction, according to certain embodiments.

FIG. 34 schematically illustrates a front view along a negative x-axis 01 of easy mount mechanism 400 in full side tilt and no forward tilt, according to certain embodiments.

Figure 35:
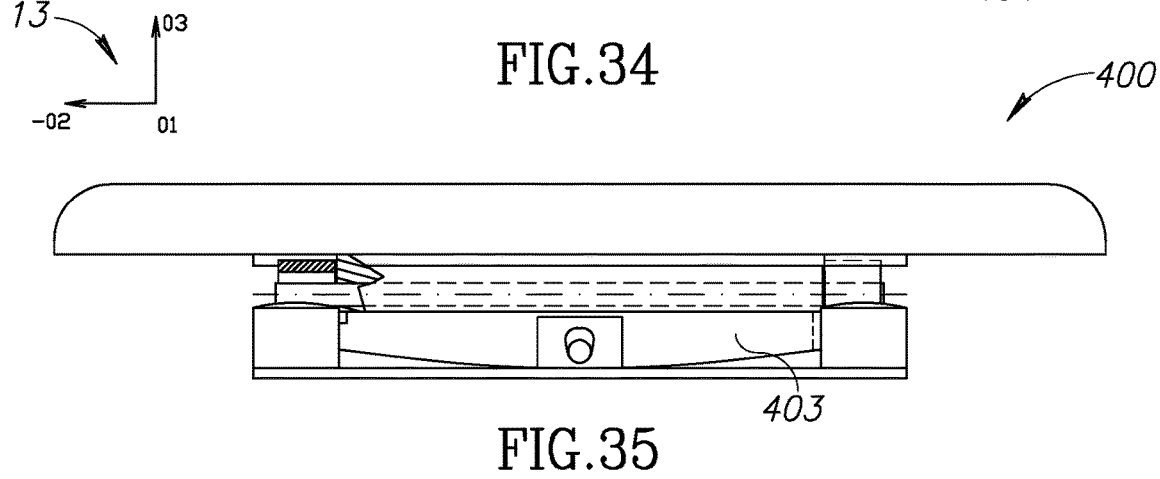
FIG. 35 schematically illustrates a side view, along a negative y-axis, of an easy mount mechanism in a zero position, according to certain embodiments.

FIG. 35 schematically illustrates a side view along y-axis 02 of easy mount mechanism 400 in a zero position, according to certain embodiments.

Figure 36:
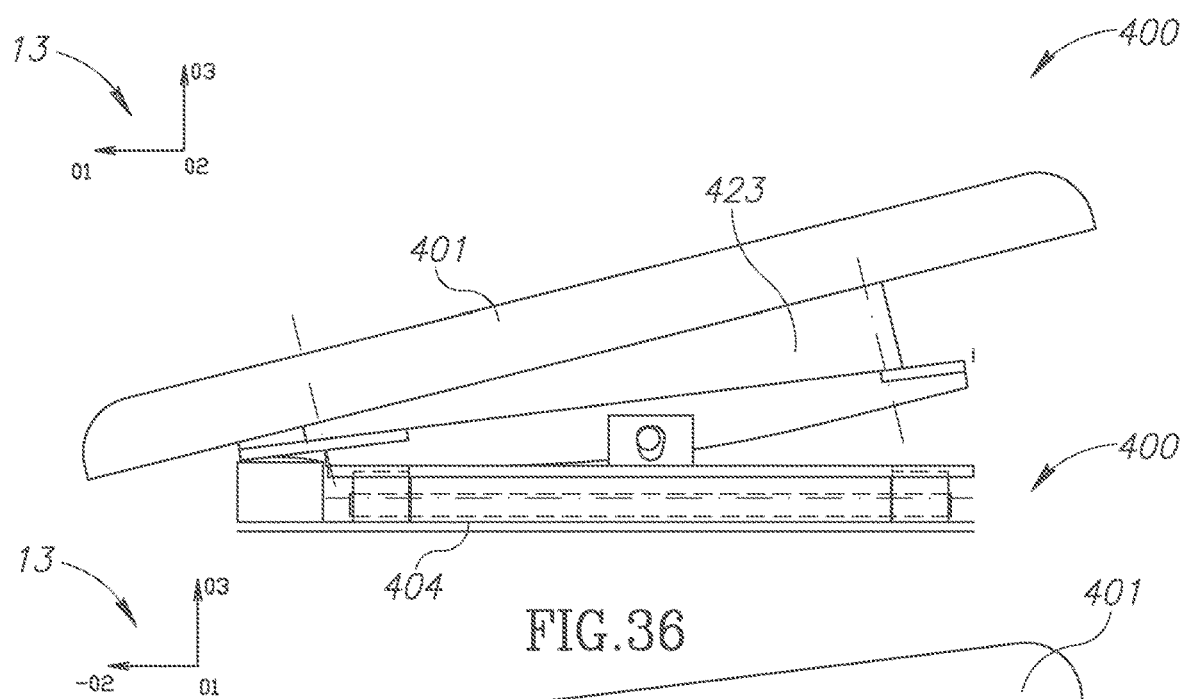
FIG. 36 schematically illustrates aside view along a negative y-axis, of an easy mount mechanism, in forward tilt in x axis direction, including an additional sitting platform spacer, which increases the tilt in forward x direction at the expense of tilt in backward, negative x direction, according to certain embodiments.

FIG. 36 schematically illustrates a side view along negative y-axis 02, of easy mount mechanism 400, in forward tilt and no side tilt, in an x-axis direction, including an additional sitting platform spacer 423, which increases the tilt in forward x-01 axis direction at the expense of tilt in backward, negative x-01 direction, according to certain embodiments.

Figure 37:
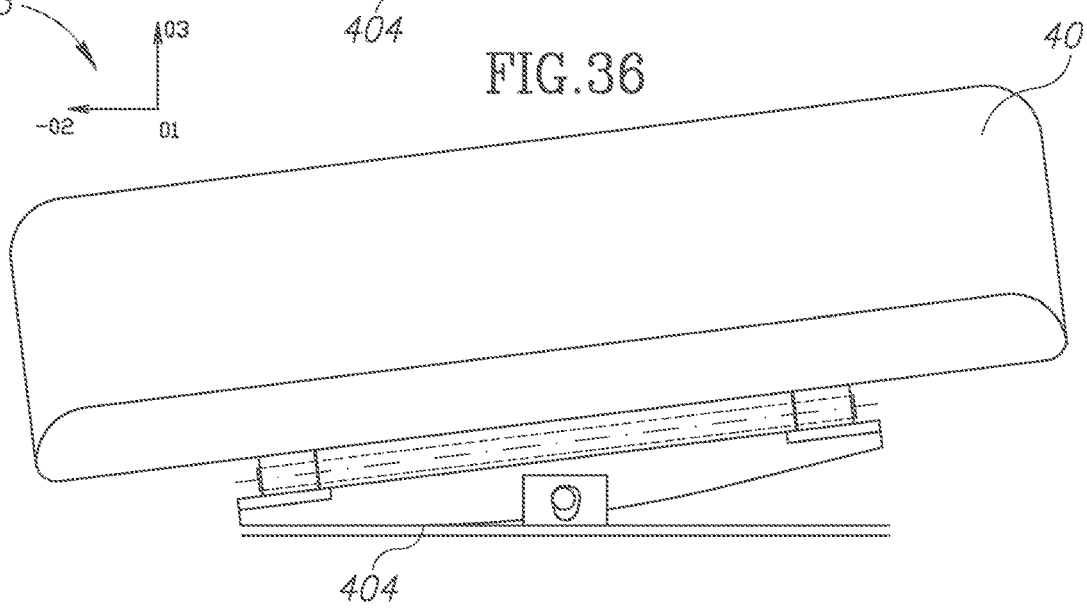
FIG. 37 schematically illustrates a front view of an exemplary easy mount mechanism along a negative x-axis, in both side and forward tilts, according to certain embodiments.

FIG. 37 schematically illustrates a front view of easy mount mechanism 400 along negative x-axis 01, in both side and forward tilts, according to certain embodiments.

Figure 38:
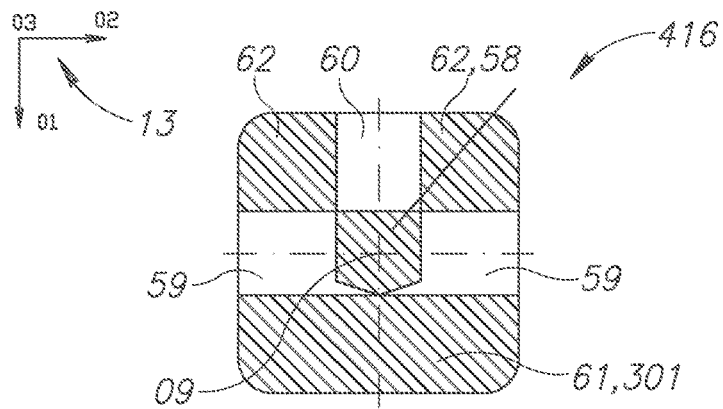
FIG. 38 schematically illustrates a mapping of possible motions of an easy mount mechanism, as function of the location of the applied force, according to certain embodiments.

FIG. 38 schematically illustrates a mapping of possible motions of easy mount mechanism 400, as function of the location of the applied force, according to certain embodiments. When a force is applied to the center of sitting platform 401, at the omnidirectional tilt area 58, sitting platform 401 can tilt omnidirectionally. When the force is applied in the forward section of the sitting platform 401, at forward stationary area 61 the sitting platform 401 cannot move at all, which eases the mounting of the sitting platform 401.

Figure 39:
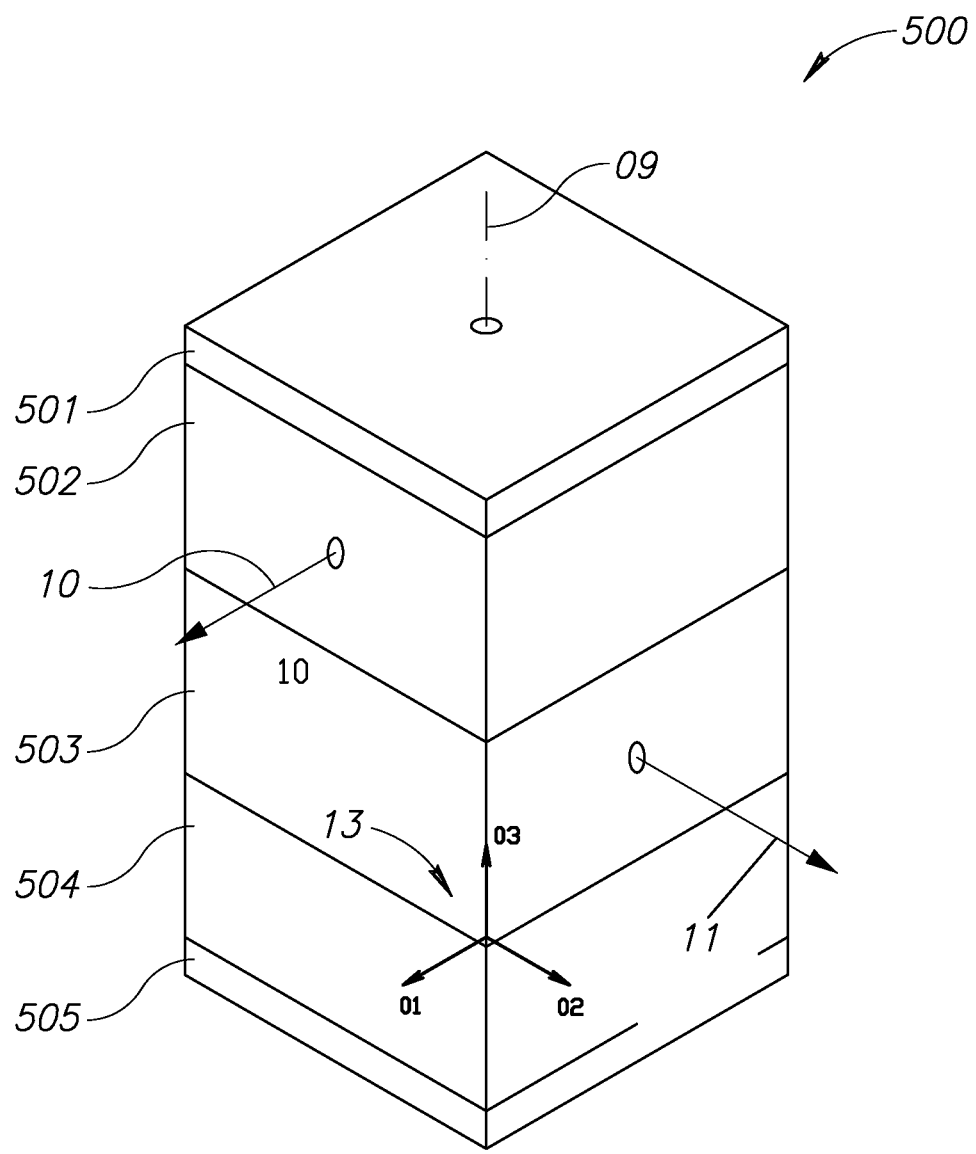
FIG. 39 schematically illustrates a strip-based mechanism, according to certain embodiments.

FIG. 39 schematically illustrates a strip-based mechanism 500, according to certain embodiments. Strip-based mechanism 500 includes a top assembly 502, a middle assembly 503 and a bottom assembly 504. In certain embodiments, top assembly 502 is coupled to a sitting platform 501 facilitating a user to sit atop of strip-based mechanism 500, and bottom assembly 504 is coupled to a mechanism base 505. Strip-based mechanism 500 is configured to enable each assembly to have a degree of freedom to roll only in one predetermined direction, for example, to roll only in an x-axis direction. Top rocker 505 and middle rocker 510 are configured to require strip mechanism 500 to adopt the only, substantially frictionless, horizontal, rolling degree of freedom. The configuration enables top assembly 502 to tilt along a forward direction 10 aligned with x-axis 01, enabling middle assembly 503 to tilt along a sideway direction 11 along a y-axis 02.

The arrangement of top rocker 502 and middle rocker 503 provide a linear relationship between top rocker 505 angle and center of mass travel. Top assembly 502 and middle assembly 503 are operatively connected to bottom assembly 504 thereby enabling top assembly 502 to tilt along forward direction 12 aligned with x-axis 01 and enabling middle assembly 403 to tilt along sideway direction 11 along a y-axis 02. Bottom assembly 504 is configured to remain static.

Figure 40:
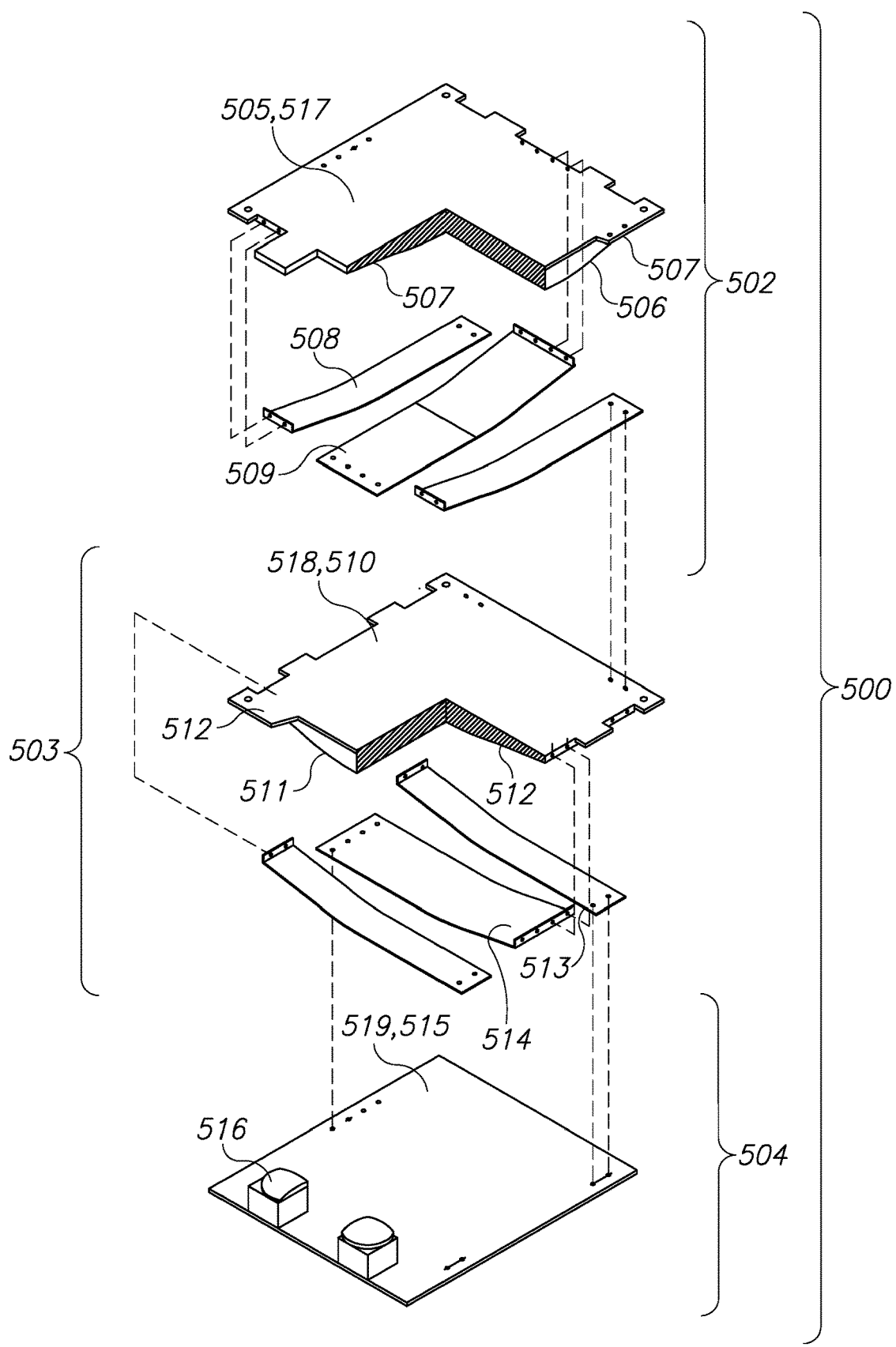
FIG. 40 schematically illustrates an exploded, isometric view of a strip-based mechanism, according to certain embodiments.

FIG. 40 schematically illustrates an exploded, isometric view of strip mechanism 500, according to certain embodiments. Top assembly 502 includes a top rocker 505 having two first stop surfaces 507, two first cylindrical surfaces 506 and a first top surface 517. A front end of top rocker 505 is affixed to a first end of two top side strips 508. A rear end of top rocker 505 is affixed to a first end of a top center strip 509. Middle assembly 503 includes a middle rocker 510 having two second stop surfaces 512 and two second cylindrical surfaces 511 and includes second top surface 518. One side of the middle rocker 510 is fixed to a first end of each one of two bottom side strips 513 and opposite side thereof to one side of a bottom center strip 514 and front side of middle assembly 503 is fixed to the other side of two top side strips 508 and opposite side to other side of top center strip 509, thereby coupling middle assembly 503 to top assembly 502. Horizontal plate 515 is fixed to other side of the bottom side strips 513 and the other side of bottom center strip 514, thereby coupling bottom assembly 504 to middle assembly 503.

Horizontal plate 515 is configured to be static.

One portion of two top side strips 508 is fixed to one side of top rocker 505 and wrapped, without any slack, around one segment of first cylindrical surface 506 of top rocker 505 and the other portion is fixed to middle rocker 510 and rests on top second top surface 518.

One portion of the top center strip 509 is fixed to other side of top rocker 505 and is wrapped, without any slack, around another segment of first cylindrical surface 506 of top rocker 505 and the other portion is fixed to middle rocker 510 and rests on second top surface 518. Top rocker 505 rolls on the top side strips 508 and top center strip 509, all being supported by second top surface 518. This configuration allows the top rocker 505, substantially, only slip less friction less rolling motion in direction of the top side strip 508 and top center strip 509. For example, rocker 505 can roll by wrapping portion of top center strip 509 and releasing equal portion of two side strips 508.

One portion of two bottom side strips 513 is fixed to one side of middle rocker 510 and wrapped, without any slack, around one segment of second cylindrical surface 511 of middle rocker 510 and the other portion is fixed to horizontal plate 515 and rests on top third top surface 519. One portion of the bottom center strip 514 is fixed to other side of middle rocker 510 and is wrapped, without any slack, around another segment of second cylindrical surface 511 of middle rocker 510 and the other portion is fixed to horizontal plate 515 and rests on third top surface 519. Middle rocker 510 rolls on the bottom side strips 513 and bottom center strip 514, all being supported by third top surface 519. This configuration allows the middle rocker 510, substantially, only slip less friction less rolling motion in direction of the bottom side strip 513 and bottom center strip 514.

Figure 41:
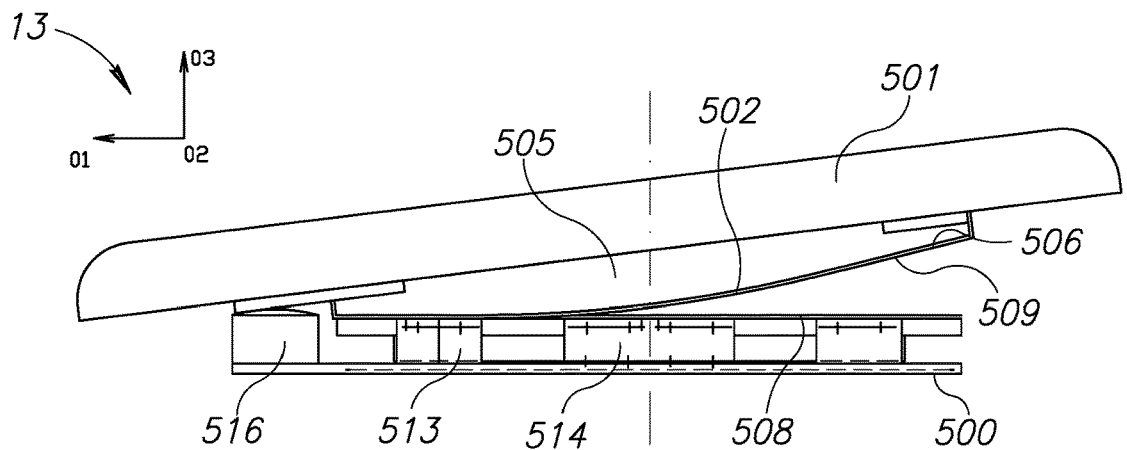
FIG. 41 schematically illustrates a side view along a negative y-axis of a strip-based mechanism in a full tilt along an x-axis direction, according to certain embodiments.

FIG. 41 schematically illustrates a side view along a negative y-axis of an easy mount configuration of a strip mechanism in a full tilt in an x axis direction, according to certain embodiments.

Figure 42:
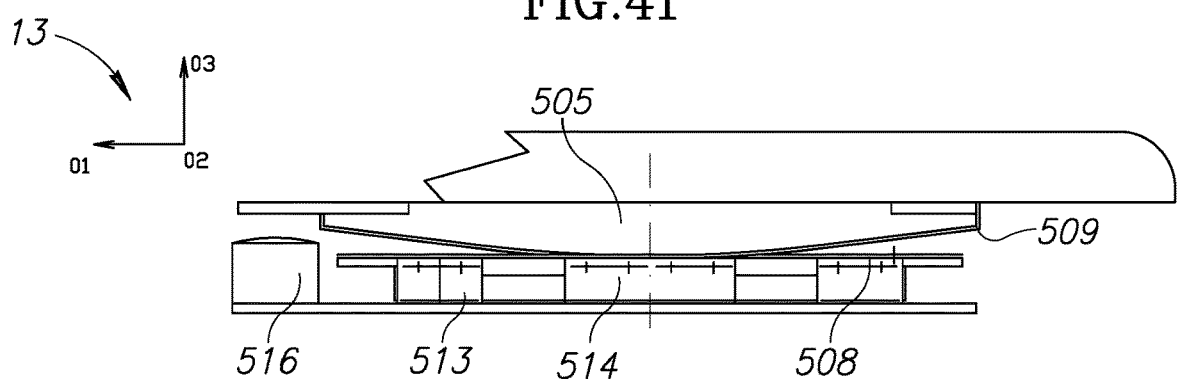
FIG. 42 schematically illustrates a side view along a negative y-axis of a strip-based mechanism arranged at a zero position, according to certain embodiments.

FIG. 42 schematically illustrates a side view along negative y-axis of an easy mount configuration of a strip mechanism in a zero position, according to certain embodiments.

Figure 43:
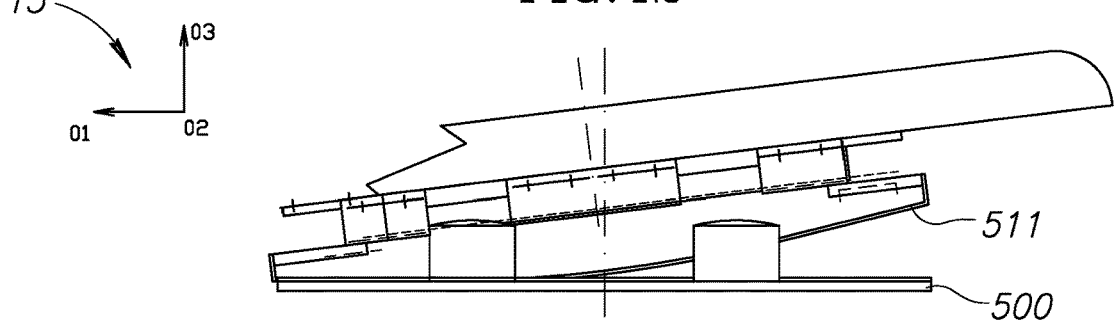
FIG. 43 schematically illustrates a front view along a negative x-axis of an easy mount mechanism in full side tilt in negative y-direction, according to certain embodiments.

FIG. 43 schematically illustrates a front view along a negative x-axis of an easy mount configuration of a strip mechanism in full side tilt in negative y-direction, according to certain embodiments.

Figure 44:
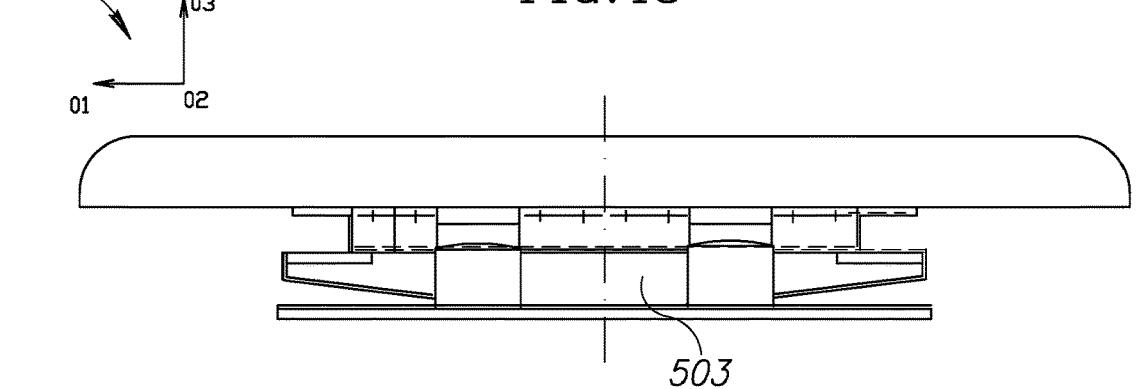
FIG. 44 schematically illustrates a side view, along a negative y-axis, of an easy mount mechanism in a zero position, according to certain embodiments.
Figure 45:
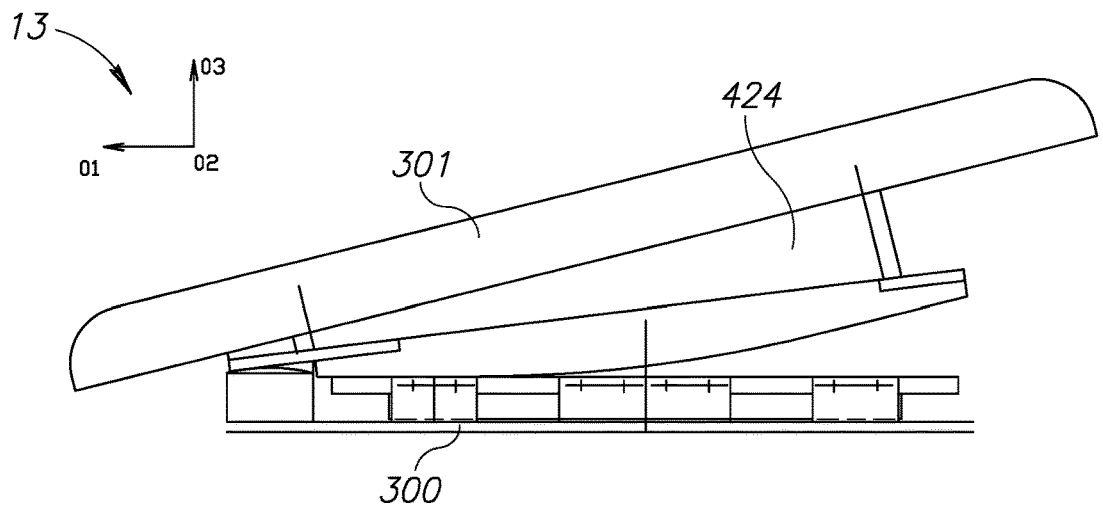
FIG. 45 schematically illustrates aside view along a negative y-axis, of an easy mount mechanism, in forward tilt in an x-axis direction, including an additional sitting platform spacer, which increases the tilt in forward x-direction at the expense of tilt in a backward negative x-direction, according to certain embodiments.

FIG. 44 schematically illustrates a side view, along a negative y-axis, of an easy mount configuration of a strip mechanism in a zero position, according to certain embodiments;

FIG. 45 schematically illustrates aside view along a negative y-axis, of an easy mount configuration of a strip mechanism, in forward tilt in x axis direction, including an additional sitting platform spacer, which increases the tilt in forward x direction at the expense of tilt in backward, negative x direction, according to certain embodiments.

Figure 46:
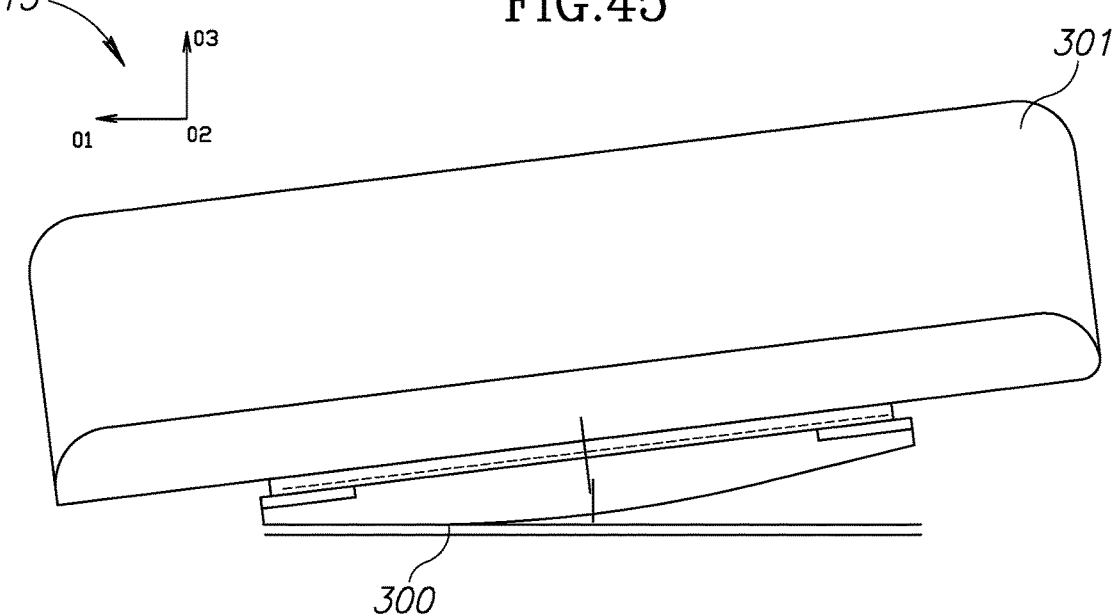
FIG. 46 schematically illustrates a front view of an exemplary easy mount mechanism along a negative x-axis, in both side and forward tilts, according to certain embodiments; and, FIG. 47 schematically illustrates a mapping of possible motions of an easy mount mechanism, as function of the location of the applied force, according to some other embodiments.

FIG. 46 schematically illustrates a front view of an exemplary easy mount configuration of strip mechanism along a negative x-axis, in both side and forward tilts, according to certain embodiments.

Figure 47:
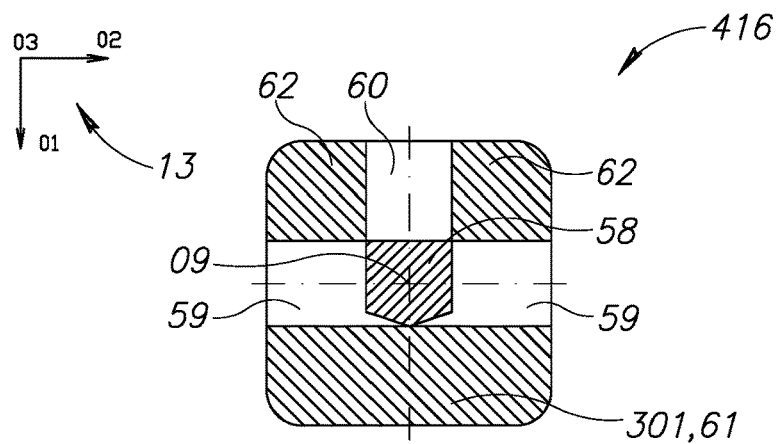

FIG. 47 schematically illustrates a mapping of possible motions of a strip mechanism, as function of the location of the applied force, according to some other embodiments.

Top assembly 502 and bottom assembly 504 are extended in forward x-axis direction.

Bottom assembly 504 includes two spherical stops 515 disposed symmetrically at the two forward positions of bottom assembly 504. When load is applied to the forward part of easy mount configuration of strip mechanism 500, top assembly 502 tilts in forward x-axis direction and one of the forward portions meets one of the spherical stops 516. Further application of the load forces top assembly 502 to rest on both spherical stops 516. When subject sits on the forward part of sitting platform 501, it is immobile thereby making mounting onto easy mount configuration of strip mechanism 500 easier for the subject by providing a steady mounting platform.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A cylindrical rocker mechanism including:
a top assembly having a first cavity;
a middle assembly including:
    at least one middle lug aligned with said first cavity to facilitate insertion of a first pin therethrough thereby coupling said top assembly with said middle assembly;
    a second cavity aligned perpendicularly to said first cavity;
a bottom assembly having a horizontal plate; and, at least one bottom lug aligned with said second cavity to facilitate insertion of a second pin therethrough thereby coupling said top assembly with said middle assembly;

wherein said top, and middle assemblies move and roll in perpendicular directions thereby facilitating a friction dependent, substantially slip-less, omnidirectional, rolling and a tilting motion of said top assembly in response to a force applied by a subject to top assembly.

2. A mechanism according to claim 1, further including a sitting platform, wherein said top surface of said top rocker being configured to provide an increased forward tilt of the sitting platform, thereby facilitating a forward tilt of a pelvis and neutral posture of a subject while the subject is sitting on the sitting platform.

3. A mechanism according to claim 1, wherein said at least one middle lug including:

a bottom curve having points of a top path after translation downwards by predetermined offset and the points being distanced outwards from the top path by retaining pin radius; and, a top curve having two arcs having a retaining pin radius and centered about top path ends and a line tangential to the two arcs and two straight line segments, each tangential to the top curve and the bottom curve, wherein the lug shape is configured to enable free motion along a predetermined range of curtate cycloid trajectories of said first pin allowing predetermined wear of the rocker and to eliminate results of slip.

4. A mechanism according to claim 1, wherein each of said top rocker and horizontal plate having an extended length and said top rocker cooperating with male spherical stops coupled symmetrically to a forward portion of said horizontal plate to immobilize said top assembly in response to any force tilting said top assembly in forward direction of said top assembly thereby facilitating mounting of said sitting platform by the subject.

* * * * *